United States Patent [19]

Kanemitsu et al.

[11] 4,356,272
[45] Oct. 26, 1982

[54] SINTERED BODIES AL$_2$O$_3$-TIC-TIO$_2$ CONTINUING YTTRIUM (Y)

[75] Inventors: Yutaka Kanemitsu, Fukuoka; Takehiko Hagio, Dazaifu; Mitsuhiko Furukawa, Fukuoka; Michito Miyahara, Nakagawa; Yoshimichi Hara; Takashi Kitahira, both of Fukuoka, all of Japan

[73] Assignee: Nippon Tungsten Co., Ltd., Fukuoka, Japan

[21] Appl. No.: 247,039

[22] Filed: Mar. 24, 1981

[30] Foreign Application Priority Data

Mar. 29, 1980 [JP] Japan ............................... 55-041071

[51] Int. Cl.$^3$ ..................... C04B 35/00; C04B 35/10; C04B 35/46; C04B 35/56
[52] U.S. Cl. ........................................ 501/87; 51/309; 264/65; 264/29.3; 501/93; 501/127; 501/134; 501/135; 501/152; 501/153
[58] Field of Search .................... 501/87, 93, 152, 153; 51/309

[56] References Cited

U.S. PATENT DOCUMENTS

| | | | |
|---|---|---|---|
| 3,377,176 | 4/1968 | Wolkodoff et al. | 501/153 |
| 3,565,643 | 2/1971 | Bergna | 501/87 |
| 3,580,708 | 5/1971 | Ogawa et al. | 51/309 X |
| 3,711,585 | 1/1973 | Muta et al. | 501/152 X |
| 3,792,142 | 2/1974 | Kobayashi et al. | 501/153 X |
| 3,886,254 | 5/1975 | Tanaka et al. | 501/87 X |
| 4,022,584 | 5/1977 | Rudy | 51/309 X |
| 4,031,177 | 6/1977 | Auriol et al. | 51/309 X |
| 4,063,908 | 12/1977 | Ogawa et al. | 501/87 X |
| 4,217,113 | 8/1980 | Suh et al. | 51/309 |
| 4,249,914 | 2/1981 | Ogawa et al. | 51/309 |

FOREIGN PATENT DOCUMENTS

| | | | |
|---|---|---|---|
| 46-15304 | 4/1971 | Japan | 501/152 |
| 49-1444 | 1/1974 | Japan | 501/87 |
| 49-2808 | 1/1974 | Japan | 501/87 |
| 49-99705 | 9/1974 | Japan | 501/93 |
| 51-6210 | 1/1976 | Japan | 501/87 |

Primary Examiner—Helen M. McCarthy
Attorney, Agent, or Firm—Jordan and Hamburg

[57] ABSTRACT

Sintered bodies having improved sinterability and toughness consist essentially of: (1) 100 parts by weight of titanium carbide, titanium oxide and aluminum oxide, the titanium carbide and titanium oxide accounting for 15 to 60 percent by weight and the aluminum oxide accounting for 85 to 40 percent by weight, the amount of titanium oxide relative to the titanium carbide and titanium oxide being 5 to 15 percent by weight, and (2) 0.039 to 1.575 parts by weight of yttrium. Sintering aids may include at least one of the oxides of magnesium, nickel, molybdenum, chromium, cobalt, iron and manganese.

6 Claims, 46 Drawing Figures

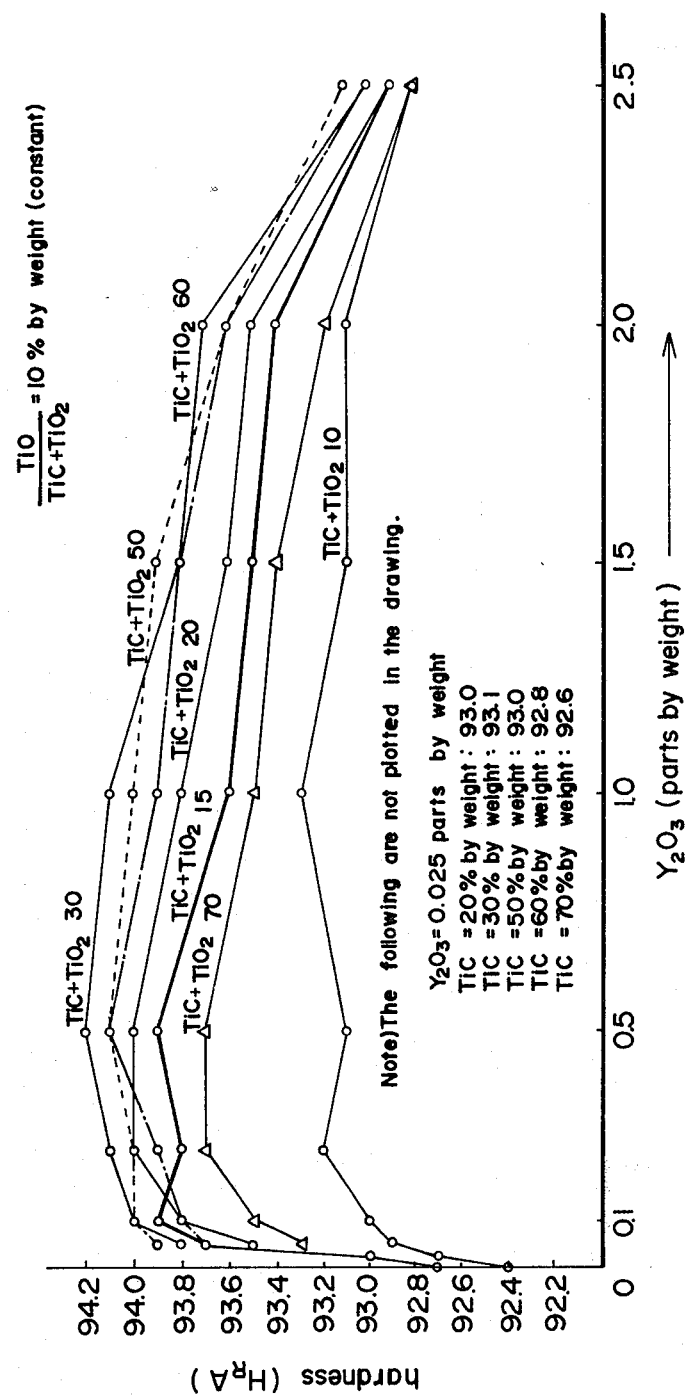

SINTERED BODIES AL$_2$O$_3$-TIC-TIO$_2$ CONTINUING YTTRIUM (Y)

BACKGROUND OF THE INVENTION

This invention relates to an aluminum oxide (Al$_2$O$_3$)-titanium carbide (TiC) sintered body which has an improved sinterability and toughness and to the method for producing such sintered body.

Sintered bodies shows high hardness at room temperature and such hardness decreases only slightly even at high atmospheric temperature. Furthermore the sintered body is provided with sufficient mechanical strength. Accordingly, the sintered body has been an important material as a sliding-parts material or a high speed cutting tool material.

Heretofore, hot pressing methods and hot isostatic pressing methods (hereinafter called the HIP method) have been proposed as effective sintering methods for producing such sintered bodies.

In conducting the HIP method, which has been a preliminary treatment in the stage of practical application, the green compact must be formed into a presintered compact so that the compact would have a density of more than 94% of the theoretical density. In the production of an Al$_2$O$_3$-TiC sintered body to which the present invention is directed, less than 1.5 percent by weight of one or two components selected from the group consisting of MgO, NiO and Cr$_2$O$_3$ is/are usually added to the green compact to restrict the grain growth of the sintered body. However, such addition of the grain growth inhibitor is still not sufficient to obtain a presintered body having the aforementioned intended relative density, unless the presintering is effected at a temperature of 1850° C. to 1900° C. However, since an Al$_2$O$_3$-TiC body is exposed to the high temperature during the presintering operation, Al$_2$O$_3$ grains and TiC grains grow in spite of the addition of the above-mentioned grain-growth inhibitor.

Accordingly, the produced sintered body exhibits poor mechanical strength. Furthermore, since the above production process necessitates the presintering at high temperature, it gives rise to an energy saving problem.

Referring now to the hot pressing method, Al$_2$O$_3$-TiC raw material powder is hot pressed at 1600° to 1800° C. to produce the sintered body. In this hot pressing method, since the sintering must be conducted at relatively high temperature, a considerable degree of the growth of the Al$_2$O$_3$-TiC grains is observed even when the above-mentioned grain growth inhibitor is added. Accordingly, the sintered body produced by the hot pressing method is also less than optimal in toughness.

It is an object of the present invention to provide a TiC-Al$_2$O$_3$ sintered body which shows little grain growth even after the sintering operation and which thereby exhibits high mechanical strength and toughness.

It is another object of the present invention to provide a method which can produce the above sintered body of improved properties inexpensively utilizing either the hot pressing method or the HIP method.

BRIEF DESCRIPTION OF THE DRAWINGS

FIG. 1 to FIG. 13 are graphs and electroscanning photomicrographs the results of the first experiment I.

DETAILED DESCRIPTION OF THE INVENTION

First Embodiment

Figure 1:
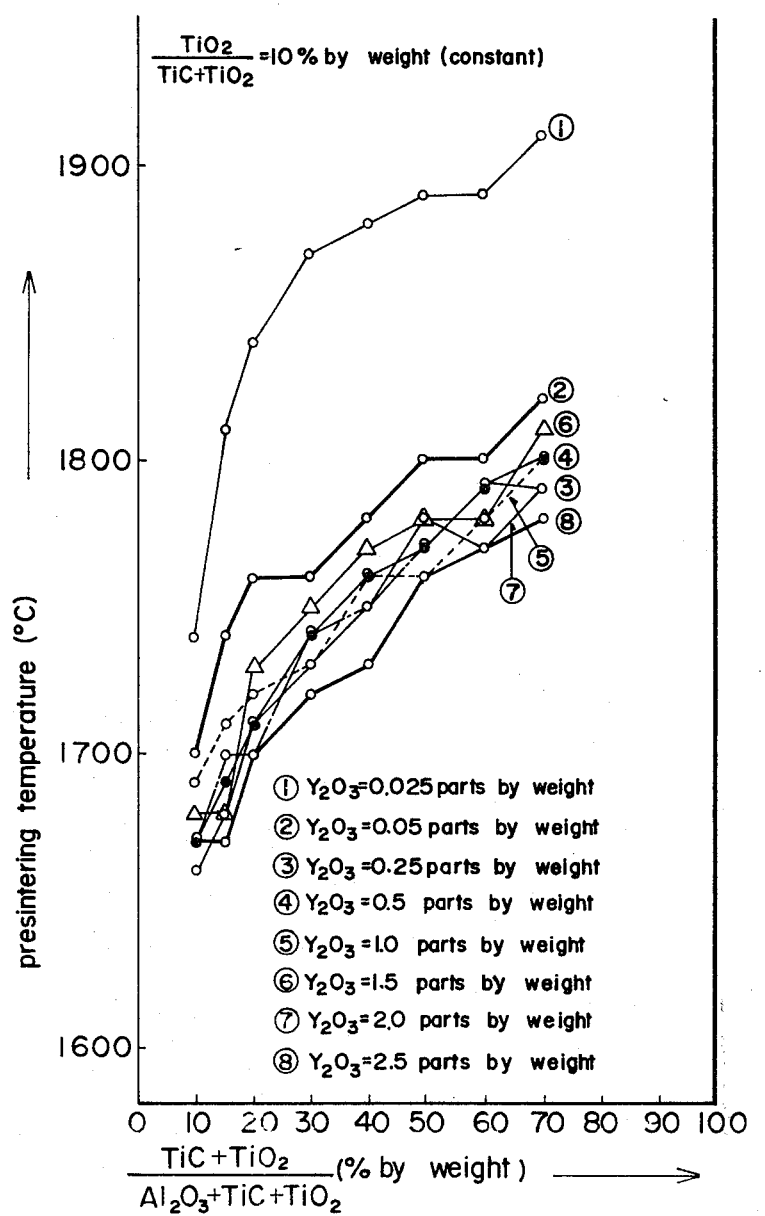

This embodiment relates to a sintered body and the method for producing the same, wherein the subject matter of the invention lies in a sintered body consisting essentially of;

(1) 100 parts by weight of titanium carbide, titanium oxide and alminum oxide, the titanium carbide and titanium oxide accounting for 15 to 60 percent by weight and said aluminum oxide accounting for 85 to 40 percent by weight, the amount of titanium oxide relative to the carbide and titanium oxide being 5 to 15 percent by weight, and (2) 0.039 to 1.575 parts by weight of yttrium in which, the yttrium and titanium oxide exist in at least one of the following forms: (a) yttrium oxide, (b) a composition of yttrium oxide and titanium carbide, (c) a composition of yttrium oxide, titanium carbide and yttrium carbide, (d) a double carbide of titanium carbide and yttrium carbide, (e) a solid solution of aluminum oxide, yttrium oxide and titanium oxide, (f) a composition of solid solution consisting of aluminum oxide, yttrium oxide and titanium oxide and a double carbide of titanium carbide and yttrium carbide, (g) a composition of solid solution consisting of aluminum oxide, yttrium oxide and titanium oxide and titanium carbide, (h) a composition of solid solution consisting of aluminum oxide, yttrium oxide and yttrium carbide, (i) a composition of solid solution consisting of aluminum oxide, yttrium oxide and titanium oxide and a solid solution consisting of titanium oxide, yttrium carbide and titanium carbide and (j) a composition of solid solution consisting of aluminum oxide, yttrium oxide and titanium oxide and a solid solution consisting of titanium carbide and titanium oxide. A method for producing such a sintered body comprises the following steps:

(1) preparing a green compact by molding a raw material mixture which contains (a) 100 parts by weight of titanium carbide, titanium oxide and aluminum oxide, the titanium carbide and titanium oxide accounting for 15 to 60 percent by weight and the aluminum oxide accounting for 85 to 40 percent by weight, the amount of titanium oxide relative to the titanium carbide and titanium oxide being 5 to 15 percent and (b) 0.05 to 2.00 parts by weight of yttrium oxide, (2) presintering the green compact in either a reducing or an inert gas atomsphere to produce a presintered compact which has a density of more than 94 percent of the theoretical density, and (3) subjecting the presintered compact to a hot isostatic pressing for effecting a sintering. A method for producing such a sintered body also comprises the following steps:

(1) preparing a raw material mixture which contains (a) 100 parts by weight of titanium carbide, titanium oxide and aluminum oxide, the titanium carbide and titanium oxide accounting for 15 to 60 percent by weight and the aluminum oxide accounting for 85 to 40 percent by weight, the amount of titanium oxide relative to the carbide and titanium oxide being 5 to 15 percent and (b) 0.05 to 2.00 parts by weight of yttrium oxide, and (2) subjecting the raw material mixture to a hot pressing for effecting a sintering.

In the above-mentioned HIP method, the reason for conducting the presintering operation in either a reducing atmosphere or an inert gas (excluding nitrogen gas) atmosphere is that in an oxidizing atmosphere, TiC is converted to $TiO_2$ by oxidization which is undesirable, while in a vacuum, $Al_2O_3$ is vaporized at around 1450° C., making the production of a dense sintered body impossible. Furthermore, in a nitrogen gas atmosphere, the nitrogen reacts with the constituent components of the final product.

The sintered body of this embodiment and the method for producing the same is further explained in view of the following experiment.

EXPERIMENT I (a) Experimental Procedure and Results $\alpha$-$Al_2O_3$ having a purity of 99.9% and a mean particle size of 0.6$\mu$ and TiC, $Y_2O_3$ and $TiO_2$ respectively having a purity of 99% and a mean particle size of 1$\mu$ were mixed in various mixing ratios by wet ball milling for 20 hours. Subsequently, water-soluble wax was added to the mixture. The mixture was granulated and molded at a pressure of 1.3 ton/cm$^2$ so that a cutting tool tip sintered compact having a square side of 13.0 mm and a thickness of 5 mm could be formed after sintering. The molding pressure was more than 0.5 ton/cm$^2$ since it was experimentally proven that such pressure is necessary in the molding operation. The green compact which was formed in the above manner at room temperature was presintered in a furnace of argon gas atmosphere so that the presintered body would have a density of more than 94% of the theoretical density after holding the compact for 1 hour at a temperature falling in a range of from 1650° to 1950° C. after the furnace temperature reached such a range.

Figure 2:
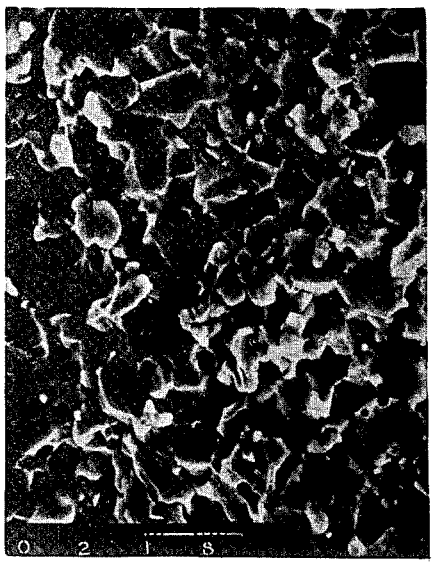
Figure 3:
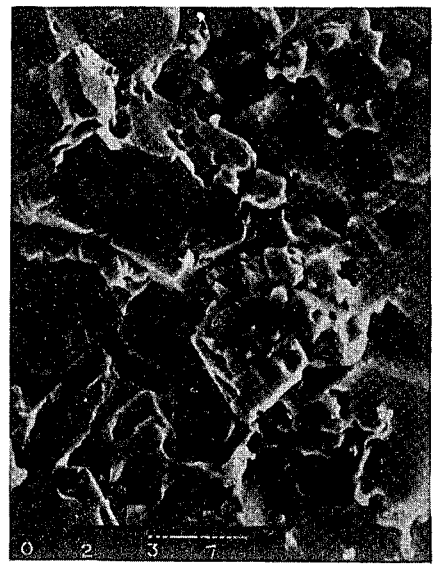
Figure 4:
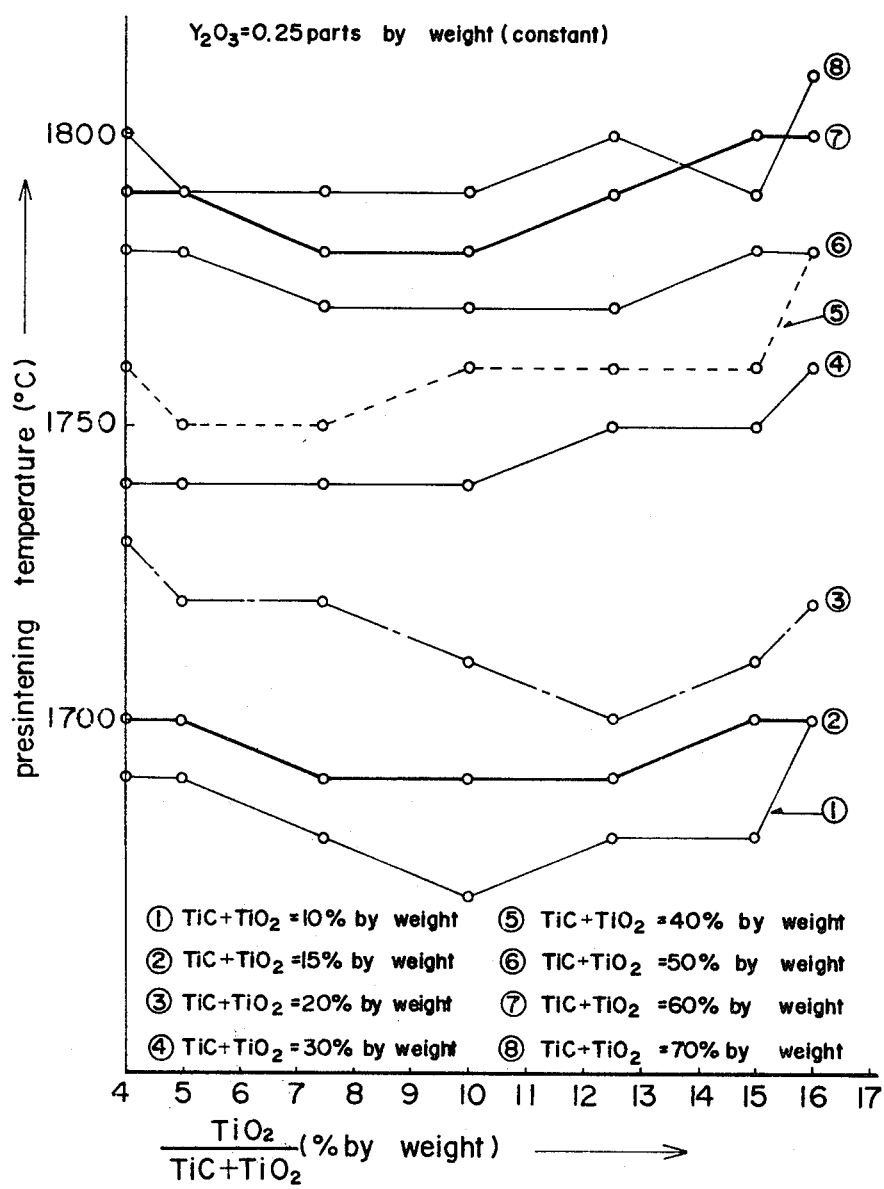

The relationship between the above holding temperature and the mixing ratio of the various compositions is shown in FIG. 1, while the electron photomicrograph of a representative sample which consists of 100 parts by weight of 70$Al_2O_3$-27TiC-3$TiO_2$ and 0.5 parts by weight of $Y_2O_3$ is shown in FIG. 2. Furthermore, for comparison purposes, the electron photomicrograph of a presintered prodict having a density of more than 94% of the theoretical density which was produced by presintering 70$Al_2O_3$-30 TiC composition (no $Y_2O_3$ included) at a holding temperature of about 1900° C. for an hour is shown in FIG. 3, FIG. 4 shows the variations of presintering temperature when the $TiO_2$/(TiC+$TiO_2$) value was varied.

Figure 6:
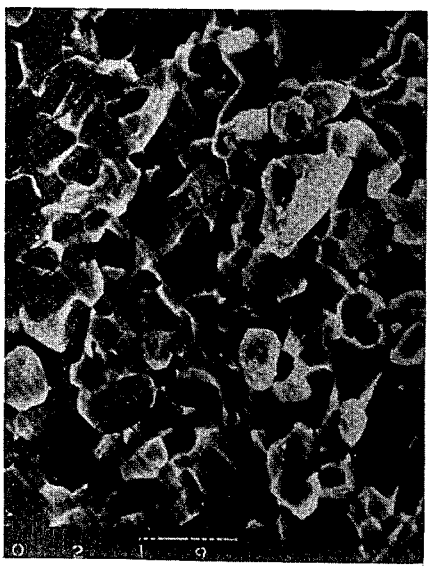

The presintered compact prepared in the above manner and having a density ranging from 94% to 95% of theoretical density was placed within a HIP furnace which includes a high pressure vessel containing a molybdenum heating element. Then the cutting tool tip presintered body was subjected to a HIP treatment for an hour at a temperature of 1400° C., under a high pressurized Argon gas atmosphere of 1000 kg/cm$^2$, thus producing the final sintered body. Subsequently, the sintered body was shaped by a diamond grinder and the hardness (Rockwell A scale) of the ground sintered body was measured. The result of the measurement is shown in FIG. 5. The electron photomicrograph of the final sintered body after HIP treatment is shown in FIG. 6. The test piece of FIG. 6 was the compact which consists of 100 parts by weight of 70$Al_2O_3$-27TiC-3$TiO_2$ and 0.5 parts by weight of $Y_2O_3$.

Figure 7:
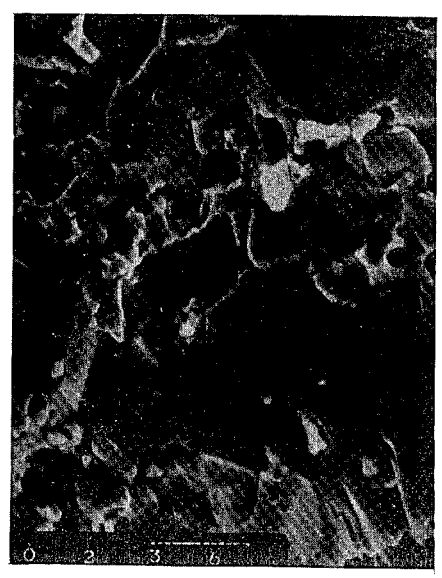
Figure 8:
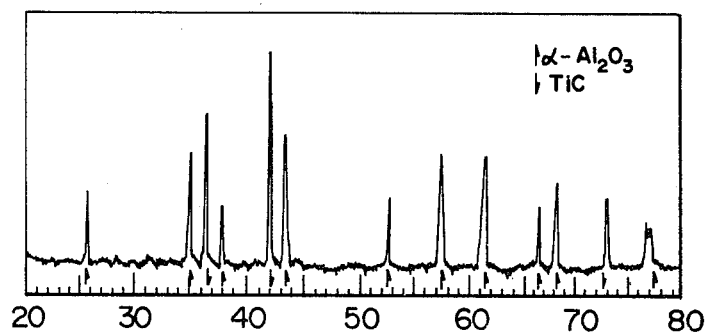
Figure 9:
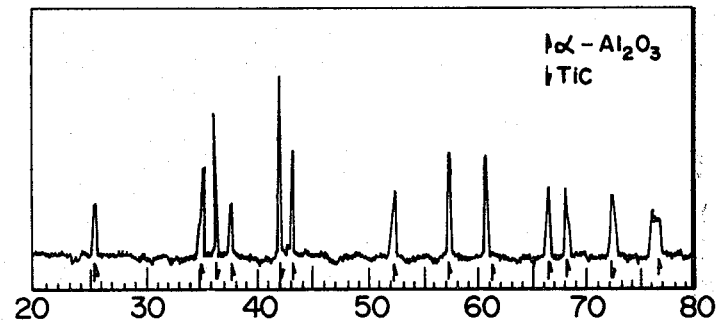

Furthermore, for comparison purposes, the electron photomicrograph of the sintered body which was produced by HIP treatment after presintering the 70$Al_2O_3$-30TiC composition (no $Y_2O_3$ included) to produce the presintered body having a density of more than 94% of the theoretical density is shown in FIG. 7. Furthermore, FIG. 8 and FIG. 9 show the photomicrographs obtained by X-ray micro-analizer analysis of the final sintered vompacts prepared from the composition consisting of 100 parts by weight of 70$Al_2O_3$-27TiC-3$TiO_2$ and 0.5 parts by weight of $Y_2O_3$ and the final sintered compacts prepared from the composition consisting of 70$Al_2O_3$-30TiC (no $Y_2O_3$ included).

Figure 10:
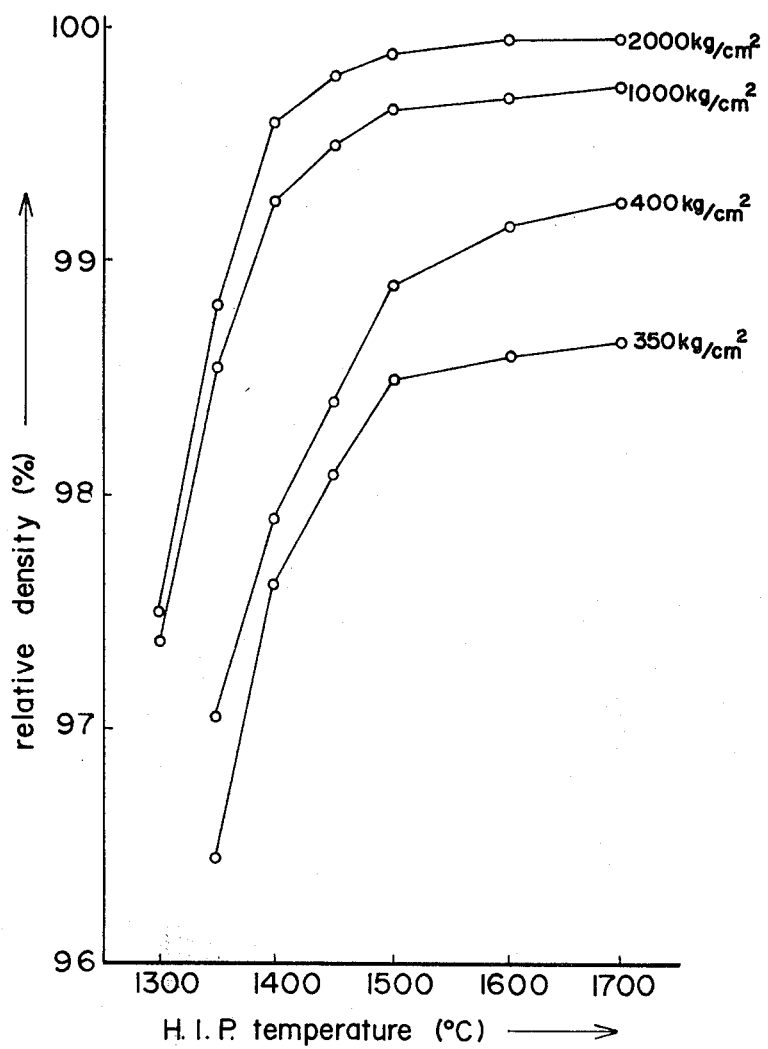

Furthermore, to obtain conditions which provide efficient or advantageous HIP treatment, the variation of the density of final sintered body relative to the theoretical density was checked by varying the sintering temperature and sintering pressure in the HIP treatment. Namely, the presintered body which was prepared by presintering the composition consisting of 100 parts by weight of 70$Al_2O_3$-27TiC-3$TiO_2$ and presintered body was subjected to HIP treatment under an Argon gas atmosphere for one hour under various temperature and pressure conditions wherein the temperature was varied in a range from 1300° C. to 1700° C. and the pressure was chosen at 350 kg/cm$^2$, 400 kg/cm$^2$, 1000 kg/cm$^2$ and 2000 kg/cm$^2$ respectively. Subsequently, the pressure in the furnace was gradually released and the furnace was gradually cooled. The results of the above experiment are shown in FIG. 10.

Figure 11:
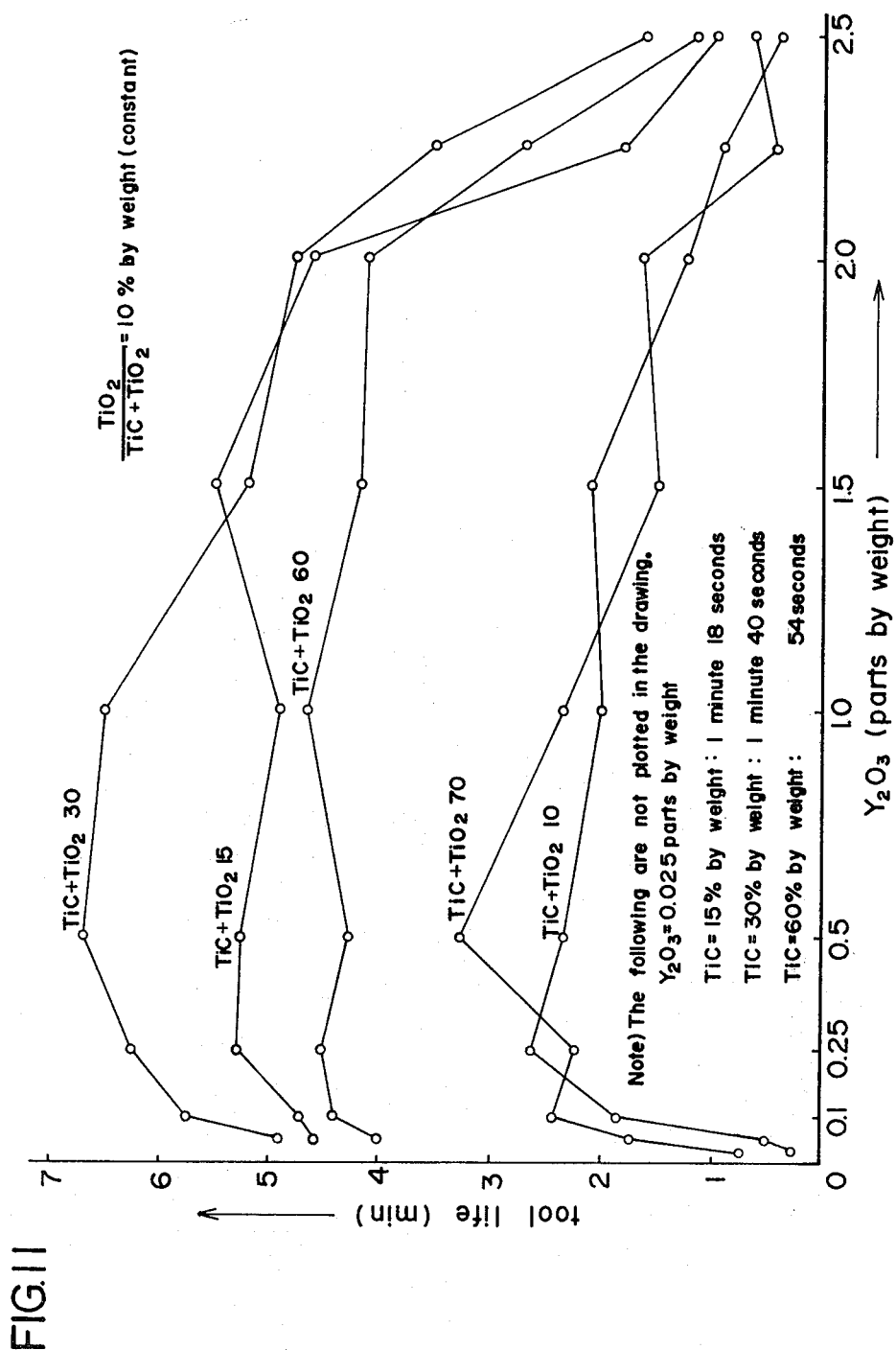
Figure 12:
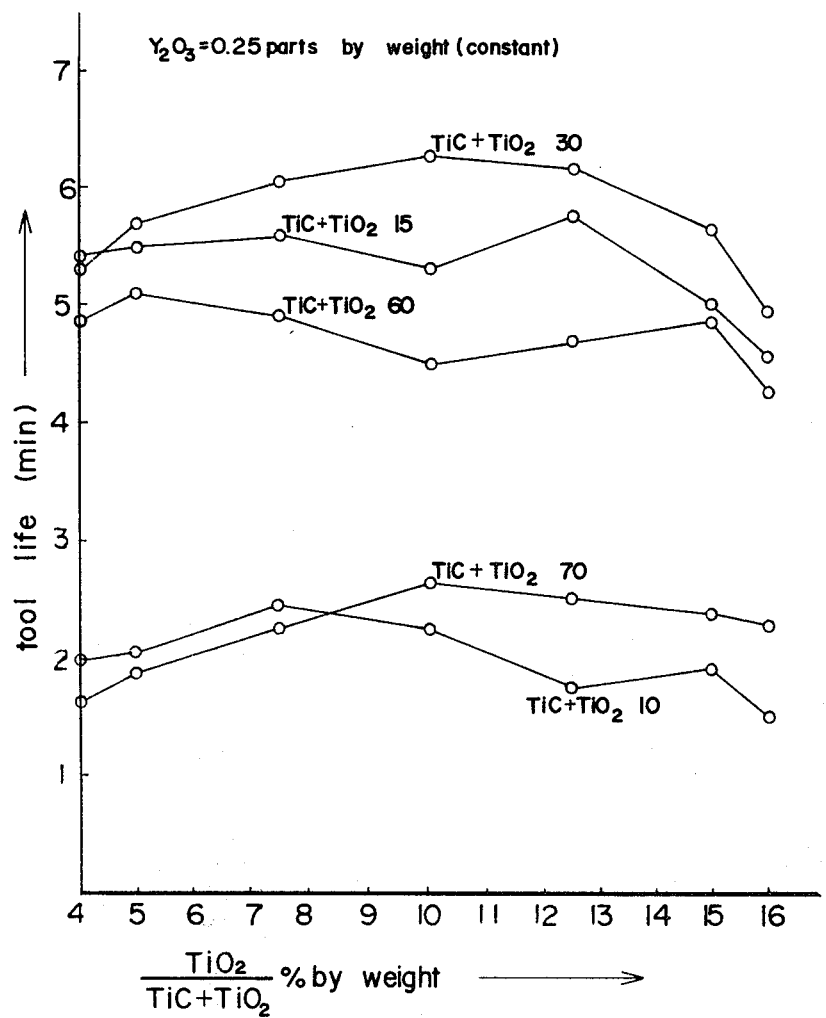
Figure 13:
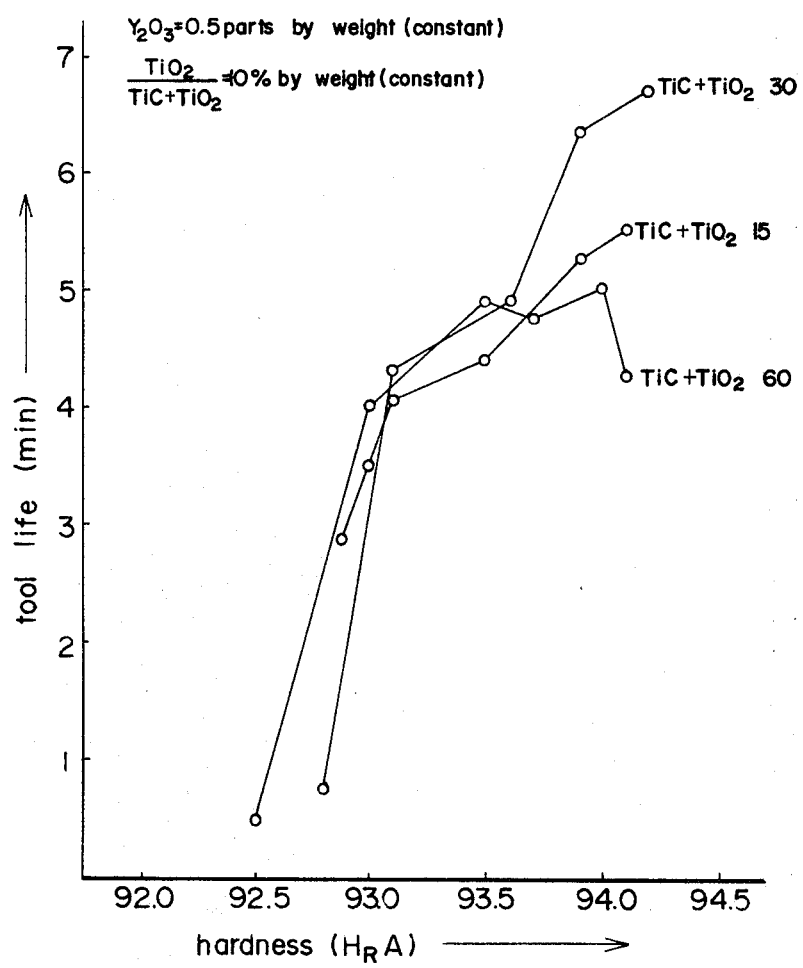

Furthermore, presintered bodies having a density of 94 to 95% of the theoretical density and prepared from green compacts of various composition rations were placed within the HIP furnace and were sintered under a pressurized argon gas atmosphere at 1400° C. for 1 hr and at 1000 kg/cm$^2$, thus producing the final sintered bodies having a density of more than 99% pf the theoretical density. Such final sintered bodies were shaped to a cutting tool style SNGN432, having a chamfer of 0.1 $\times$ 30°. Such shaped or processed bodies were used in tests to evaluate cutting performance. The cutting conditions were as follows:

Continuous Cutting Test work piece: high-hardened steel SNCM-8 (hardness Hs85)

cutting condition: V$\times$d$\times$f=50 m/min$\times$0.5 mm$\times$0.2 mm/rev tool life evaluation: width of flank wear 0.3 mm The result of the continuous cutting tests are shown in the graphs of FIG. 11, FIG. 12 and FIG. 13.

Chipping Resistance Cutting Test work piece: cast iron FC25 cutting condition: V$\times$d=245 m/min$\times$1.5 mm tool life evaluation: milling was condicted with the above conditions while changing the feed per tooth (mm/tooth) from 0.4 to 0.5, 0.6, 0.7, 0.8, 0.9 and 1.0 and the tool life was judged when the chipping occurred on the tip of the cutting tool.

The results of the chipping resistance cutting test in which the value of $TiO_2$/(TiC+$TiO_2$) was held constant at 10 percent by weight are shown in Table 1 while the results of the same test in which Y$_2$O$_3$ was held constant at 0.25 parts by weight are shown in Table 2. In Tables 1 and 2, mark "O" indicates no chipping occurred in two trials, mark "Δ" indicated that chipping occurred in one trial and mark "x" indicates that chipping occurred in both trials.

TABLE 1

| $\frac{TiC + TiO_2}{Al_2O_3 + TiC + TiO_2} \times 100$ (% by weight) | Y$_2$O$_3$ (parts by weight) | feed f (mm/tooth) | | | | | | |
|---|---|---|---|---|---|---|---|---|
| | | 0.4 | 0.5 | 0.6 | 0.7 | 0.8 | 0.9 | 1.0 |
| 10 | 0.025 | O | x | | | | | |
| | 0.050 | O | Δ | x | | | | |
| | 0.500 | O | O | x | | | | |
| | 1.000 | O | x | | | | | |
| | 2.000 | O | x | | | | | |
| | 2.500 | Δ | x | | | | | |
| 15 | 0.025 | O | O | Δ | x | | | |
| | 0.050 | O | O | O | O | x | | |
| | 0.500 | O | O | O | O | O | Δ | x |
| | 1.000 | O | O | O | O | O | x | |
| | 2.000 | O | O | O | O | O | x | |
| | 2.500 | O | O | O | x | | | |
| 30 | 0.025 | O | O | O | x | | | |
| | 0.050 | O | O | O | O | O | x | |
| | 0.500 | O | O | O | O | O | O | x |
| | 1.000 | O | O | O | O | O | Δ | x |
| | 2.000 | O | O | O | O | Δ | x | |
| | 2.500 | O | O | x | | | | |
| 60 | 0.025 | O | Δ | x | | | | |
| | 0.050 | O | O | O | O | O | x | |
| | 0.500 | O | O | O | O | O | Δ | x |
| | 1.000 | O | O | O | O | O | x | |
| | 2.000 | O | O | O | O | x | | |
| | 2.500 | O | x | | | | | |
| 70 | 0.025 | Δ | x | | | | | |
| | 0.050 | O | O | x | | | | |
| | 0.500 | O | O | Δ | x | | | |
| | 1.000 | O | Δ | x | | | | |
| | 2.000 | O | x | | | | | |
| | 2.500 | Δ | x | | | | | |

TABLE 2

| $\frac{TiC + TiO_2}{Al_2O_3 + TiC + TiO_2} \times 100$ (% by weight) | $\frac{TiO_2}{TiC + TiO_2} \times 100$ (% by weight) | feed f (mm/tooth) | | | | | | |
|---|---|---|---|---|---|---|---|---|
| | | 0.4 | 0.5 | 0.6 | 0.7 | 0.8 | 0.9 | 1.0 |
| 10 | 4.0 | O | Δ | x | | | | |
| | 5.0 | O | O | x | | | | |
| | 7.5 | O | O | Δ | x | | | |
| | 10.0 | O | O | O | x | | | |
| | 12.5 | O | O | x | | | | |
| | 15.0 | O | O | Δ | x | | | |
| | 16.0 | O | x | | | | | |
| 15 | 4.0 | O | O | O | O | x | | |
| | 5.0 | O | O | O | O | O | Δ | x |
| | 7.5 | O | O | O | O | O | O | x |
| | 10.0 | O | O | O | O | O | O | x |
| | 12.5 | O | O | O | O | O | x | |
| | 15.0 | O | O | O | O | Δ | x | |
| | 16.0 | O | O | O | x | | | |
| 30 | 4.0 | O | O | O | O | Δ | x | |
| | 5.0 | O | O | O | O | O | Δ | x |
| | 7.5 | O | O | O | O | O | O | O |
| | 10.0 | O | O | O | O | O | O | Δ |
| | 12.5 | O | O | O | O | O | Δ | x |
| | 15.0 | O | O | O | O | O | x | |
| | 16.0 | O | O | O | Δ | x | | |
| 60 | 4.0 | O | O | O | O | x | | |
| | 5.0 | O | O | O | O | O | x | |
| | 7.5 | O | O | O | O | O | O | x |
| | 10.0 | O | O | O | O | O | O | Δ |
| | 12.5 | O | O | O | O | O | x | |
| | 15.0 | O | O | O | O | O | Δ | x |
| | 16.0 | O | O | O | O | O | Δ | x |
| 70 | 4.0 | O | O | x | | | | |
| | 5.0 | O | O | O | Δ | x | | |
| | 7.5 | O | O | O | O | x | | |
| | 10.0 | O | O | O | x | | | |
| | 12.5 | O | O | O | Δ | x | | |
| | 15.0 | O | O | x | | | | |

TABLE 2-continued

| $\frac{TiC + TiO_2}{Al_2O_3 + TiC + TiO_2} \times 100$ (% by weight) | $\frac{TiO_2}{TiC + TiO_2} \times 100$ (% by weight) | feed f (mm/tooth) 0.4 0.5 0.6 0.7 0.8 0.9 1.0 |
|---|---|---|
|  | 16.0 | O △ × |

Furthermore, to check the influence of presintering atmosphere, the composition comprising 100 parts by weight of 70Al$_2$O$_3$-27TiC-3TiO$_2$ and 0.25 parts by weight of Y$_2$O$_3$ was presintered to form a presintered body having a density of more than 94% to 95% of the theoretical density. Subsequently, the presintered body was treated by the HIP method under pressurized argon gas atmosphere at 1400° C. for 1 hr and at 1000 kg/cm$^2$ pressure. The relative density and the hardness of the final sintered body are both shown in Table 3.

TABLE 3

| Presintering Atmosphere | | Ar | CO | H$_2$ |
|---|---|---|---|---|
| Presintering temperature at least necessary to make the relative density more than 94 to 95% (°C.) | | 1760 | 1750 | 1765 |
| Sintering the presintered body at 1400° C. and 1000 kg/cm$^2$ | relative density (%) | 99.25 | 99.3 | 99.4 |
| | hardness (H$_{RA}$) | 94.1 | 94.2 | 94.0 |

(b) Evaluation

From FIG. 1 and FIG. 4, which show the relationship between the temperature and the raw material compositions for obtaining the presintered bodies having the relative theoretical density necessary for applying the HIP method, it was found that when TiO$_2$/(TiC+TiO$_2$) (×100%) is less than 5% by weight, the effect of TiO$_2$ on the improvement of sintering decreases and the presintering temperature rises. The same holds true for the case when TiO$_2$/(TiC+TiO$_2$) (×100%) exceeds more than 15% by weight. It is considered that so long as TiO$_2$/(TiC+TiO$_2$) (×100%) is below 15% by weight, TiO$_2$ plays a significant role in improving the sinterability by reacting with free carbon in TiC material and other components however, when TiO$_2$/(TiC+TiO$_2$) exceeds 15% by weight, TiC is oxidized thereby making the TiC constituent particles brittle. It was also found that compared to the presintered body which contains no Y$_2$O$_3$, the presintering temperature is lowered corresponding to the increase of the addition of Y$_2$O$_3$. However, so long as Y$_2$O$_3$ accounts for less than 0.05 parts by weight, the lowering of the presintering temperature is not sufficient, therefore the constituent particles of the presintered body cannot be made fine.

From FIG. 2 it is observed that the presintered body containing the suitable amount, namely 0.5 parts by weight of Y$_2$O$_3$ can have uniform and minute constituent grain or structure.

Referring to the hardness of the final sintered body, as can be observed in FIG. 5, the sintered body containing 0.025 parts by weight of Y$_2$O$_3$ exhibits a certain degree of hardness increase compared to the sintered body containing no Y$_2$O$_3$. However, as described above, since such a sintered body lacks presinterability, the constituent grains grew to a certain degree. Therefore, the hardness thereof was insufficient, namely less than H$_{RA}$93.0. Whereas, when the Y$_2$O$_3$ addition accounts for more than 0.05 parts by weight, the constituent grains become minute. Therefore the hardness of the sintered body becomes more than H$_{RA}$93.0 provided that the TiC and TiO$_2$ amounts fall in the preferred range of this invention. FIG. 6 and FIG. 7 expressly show that the sintered body according to this invention (FIG. 6) has extremely minute grain structure compared to the grain structure of conventional sintered body (FIG. 7).

Judging from the graph of FIG. 10 which shows HIP conditions, in order to obtain the final sintered body having a density of more than 98.5% by weight of the theoretical density, it is desirable that the sintering pressure be determined in a range of from 1000 to 2000 kg/cm$^2$, since sintering at low pressure requires an extremely high sintering temperature. Although not shown in the graph, it was experimentally found that when the sintering is conducted at about 1700° C., the period for sintering can be shortened to about 20 minutes, thereby restricting the growth of the constituent grains.

In utilizing the product of this invention as the cutting tool, the influence of composition distribution and hardness which affect the tool life of the cutting tool was shown in FIG. 11, FIG. 12 and FIG. 13. It was found from these graphs that when the Y$_2$O$_3$ amount is less than 0.05 parts by weight, the tool life is extremely shortened, while when the Y$_2$O$_3$ amount exceeds 2 parts by weight, the tool life is still shortened. It was also found that the tool life is closely related to the hardness of the sintered body. In general, the harder the tool, the longer the tool life. When TiO$_2$/(TiC+TiO$_2$) (×100%) is less than 5 weight % and above 15 weight %, the tool life is shortened. When TiC+TiO$_2$ is less than 15 weight %, since the number of TiC grains which exist in the Al$_2$O$_3$ grain boundary is small, Al$_2$O$_3$ tends to foster the growth of the grains thereof, whreras when TiC+TiO$_2$ increases up to about 70 weight %, TiC produces the growth of grains thereof. It is understood that in both cases, the tool life is shortened. If the hardness is more than H$_{RA}$93.0, judging from FIG. 13, the tool life is more than 4 minutes. This value (4 minutes) is sufficient as tool life in view of the extremely severe cutting conditions which have been previously.

From Table 1 and Table 2 which show the chipping resistance if the cutting tool, it was found that when TiC+TiO$_2$ is either 10% by weight or 70% by weight, the sintered bodies exhibit poor performance, while the Y$_2$O$_3$ amount should preferably fall in a range from 0.05 to 2.00 parts by weight. Since the presintering atmosphere does not vary in any noticeable manner even when any gas is selected from a group consisting of Ar gas, CO gas and H$_2$ gas for presintering purposes. Ar gas was used in the experiment in view of safety and economy.

EXPERIMENT II (a) Experimental Procedure and Results

α-Al$_2$O$_3$ having a purity of 99.9% and a mean particle size of 0.6μ and TiC, TiO$_2$ and Y$_2$O$_3$ having a purity of 99% and a mean particle size of 1μ were mixed in various mixing ratios by wet ball milling for 20 hours. The mixture was then sufficiently dried to prepare the sintering raw material. The raw material was packed in a graphite crucible having a size of 50×50 square and 60 mm high. A crucible was inserted in a high frequency coil and the pressure within the crucible was raised up to 200 kg/cm² at various temperatures which fall in a range from 1350° C. to 1850° C. Such a condition was maintained for 60 minutes. Subsequently, the pressure was released from the crucible and the crucible was gradually cooled, producing a sintered body having a size of 50×50×5.5 mm cube.

The hot press temperature for sintering the compact so that the sintered body could have a density of at least more than 98.5% of the theoretical density is shown in Table 4, provided that the pressure was 200 kg/cm², the holding time was 60 minutes, and $TiO_2/(TiC+TiO_2)$ ($\times 100\%$) was 10% by weight.

TABLE 4

| $Y_2O_3$ (parts by weight) | $\dfrac{TiC + TiO_2}{Al_2O_3 + TiC + TiO_2} \times 100$ (% by weight) | | | | | | | |
|---|---|---|---|---|---|---|---|---|
| | 10 | 15 | 20 | 30 | 40 | 50 | 60 | 70 |
| 0.025 | 1480 | 1520 | 1680 | 1740 | 1790 | 1800 | 1810 | 1830 |
| 0.050 | 1420 | 1440 | 1450 | 1580 | 1640 | 1680 | 1740 | 1750 |
| 0.250 | 1420 | 1430 | 1440 | 1580 | 1630 | 1670 | 1740 | 1750 |
| 0.50 | 1410 | 1430 | 1430 | 1570 | 1630 | 1670 | 1730 | 1740 |
| 1.00 | 1410 | 1430 | 1430 | 1560 | 1630 | 1660 | 1730 | 1740 |
| 1.50 | 1410 | 1420 | 1420 | 1560 | 1620 | 1660 | 1720 | 1740 |
| 2.00 | 1400 | 1420 | 1420 | 1550 | 1620 | 1650 | 1720 | 1740 |
| 2.50 | 1400 | 1420 | 1420 | 1550 | 1630 | 1650 | 1710 | 1730 |

Figure 17:
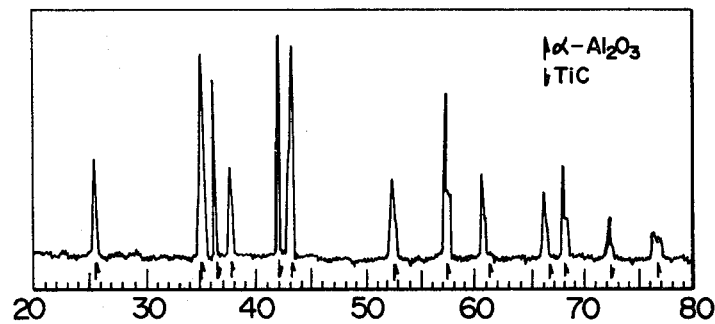
FIG. 14 to FIG. 20 are graphs and electroscanning photomicrographs showing the results of the second experiment II.
Figure 16:
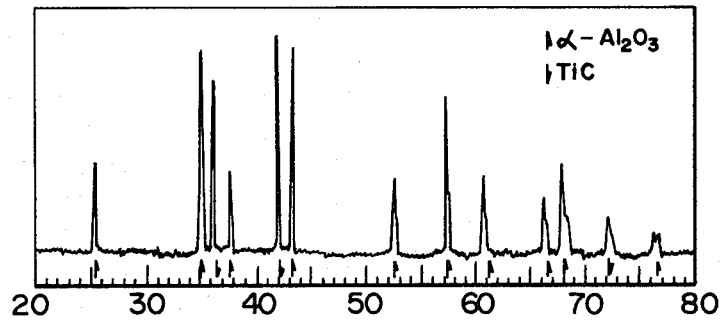
Figure 14:
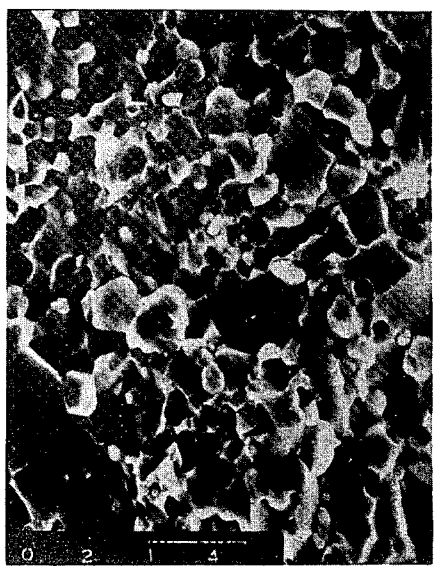
Figure 15:

Additionally, the electron photomicrographs of the sintered bodies which were obtained by the composition consisting of 100 parts by weight of 70Al₂O₃-27TiC-3TiO₂ and 0.5 parts by weight of added Y₂O₃ and the composition consisting of 70Al₂O₃-30TiC (no Y₂O₃ being included) are shown in FIG. 14 and FIG. 15, while the X-ray refraction microphotographs of these sintered bodies are shown in FIG. 16 and FIG. 17 respectively. The hot pressing conditions were 1570° C. for 60 minutes and 200 kg/cm² as to the sintered body containing Y₂O₃, while the conditions were 1750° C. for 60 minutes and 200 kg/cm² for the body containing no Y₂O₃.

Subsequently, the sintered body obtained in the above manner was cut by a diamond cutting wheel and abrasive, then a tool having the cutting tool style SNGN432 and a chamfer of 0.1×30° was produced. The results on hardness measurement conducted on respective cutting tools are almost the same as the hardness measurement results obtained in the HIP operation.

Figure 18:
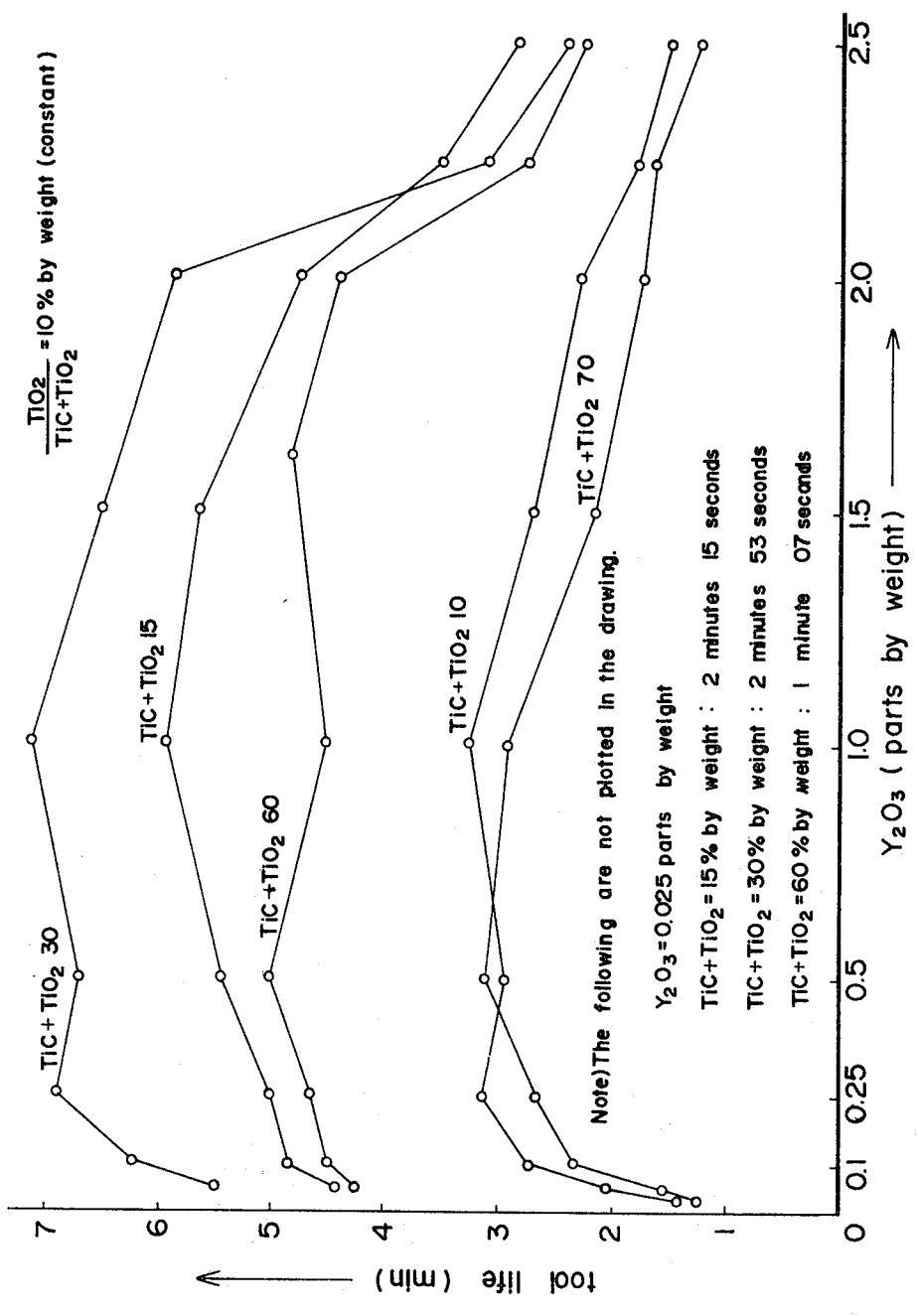
Figure 19:
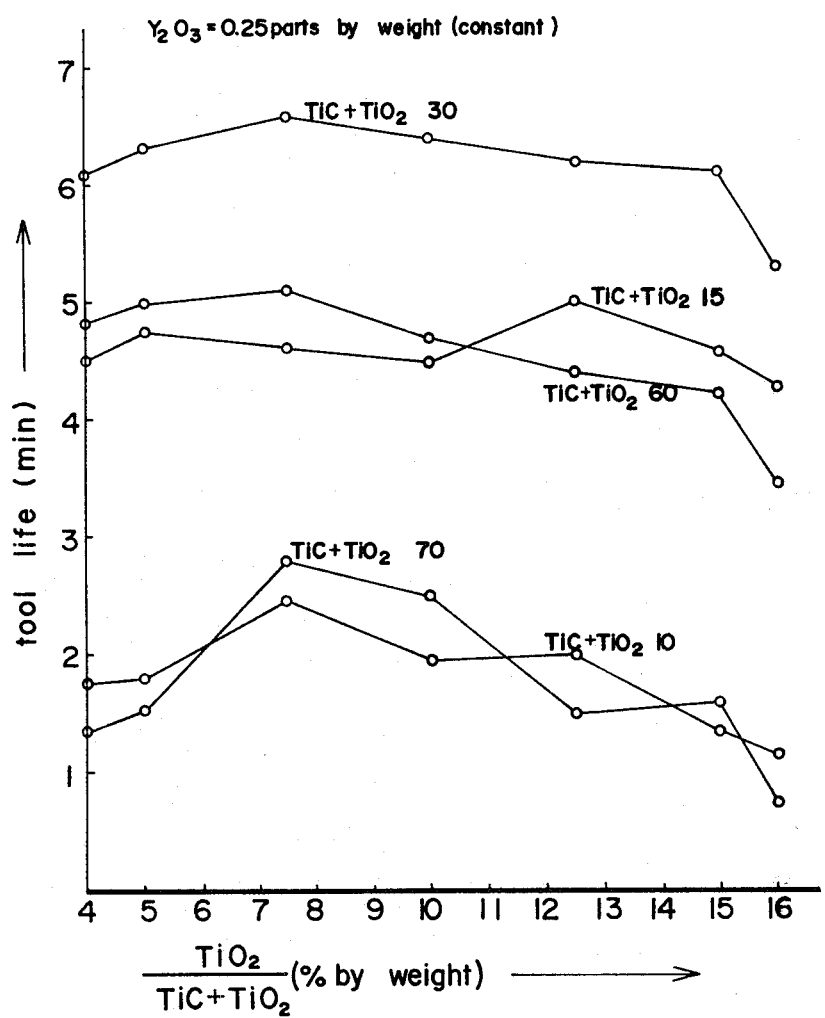
Figure 20:
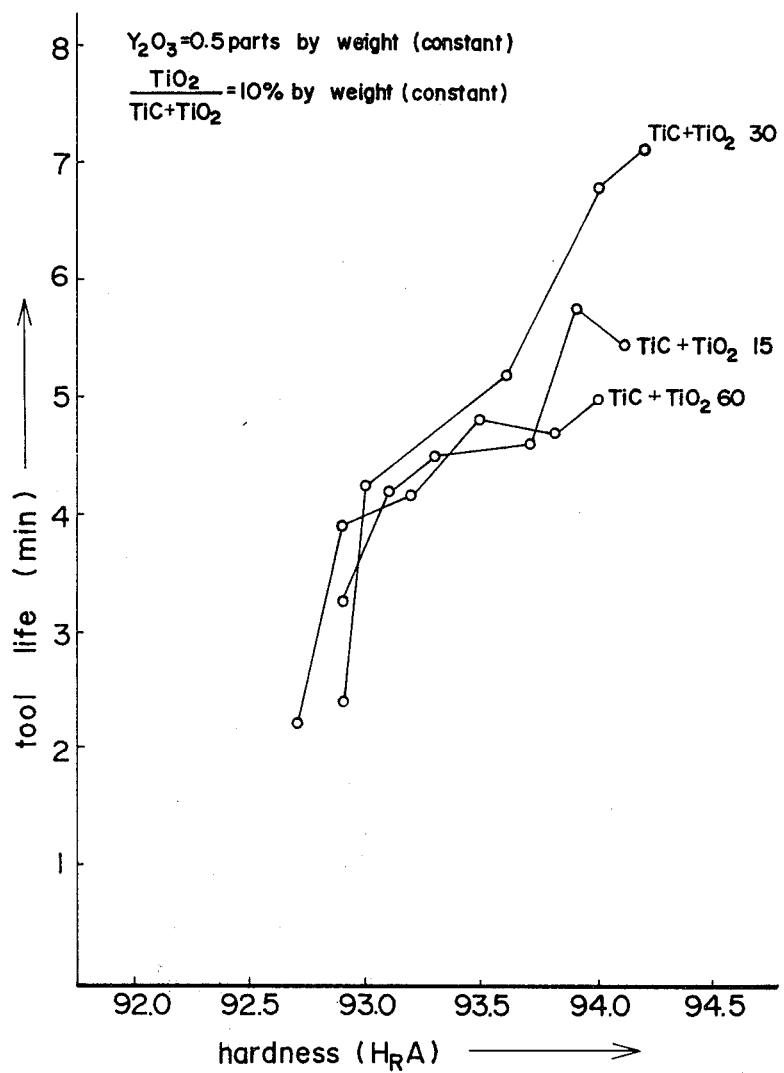

For evaluating the cutting performance of the various cutting tools, the cutting tools were subjected to continuous cutting test in which a lathe was used, work pieces were of high-hardened steel SNCM-8 (Hs85) and V×d×f were 50 m/min×0.5 mm×0.2 mm/rev. respectively. In this cutting test, the tool life criterion was determined when the width of the flank wear reached 0.3 mm. FIG. 18 shows the tool life of the cutting tool eith the condition that $TiO_2/(TiC+TiO_2)$ ($\times 100\%$) was held constant at 10% by weight and the Y₂O₃ amount was varied. FIG. 19 shows the tool life of the cutting tool with the condition that the Y₂O₃ amount was held constant at 0.25 parts by weight and the $TiO_2/(TiC+TiO_2)$ ($\times 100\%$) was varied. FIG. 20 shows the relationship between the hardness and the tool life.

Furthermore, to check the chipping resistance of various cutting tools, the resulta of the milling in which the cast iron (FC25) was cut under the following cutting conditions are shown in Table 5 and Table 6:

V×d = 245 m/min×1.5 mm

Feed = 0.4~1.0 mm/tooth

Namely, Table 5 shows the results of the chipping resistance test in which the $TiO_2/(TiC+TiO_2)$ ($\times 100\%$) was held constant and the Y₂O₃ amount was varied, while Table 6 shows the results of the chipping resistance test in which the $TiO_2/(TiC+TiO_2)$ ($\times 100\%$) was varied.

In these Tables, the mark "O" indicates no chipping occurred in both (two) trials of the milling operation, the mark "Δ" indicates the chipping occured in one trial of the milling operation, and the mark "x" indicates chipping occurred in both trials of milling operation.

TABLE 5

| $\dfrac{TiC + TiO_2}{Al_2O_3 + TiC + TiO_2} \times 100$ (% by weight) | $Y_2O_3$ (parts by weight) | feed f (mm/tooth) | | | | | | |
|---|---|---|---|---|---|---|---|---|
| | | 0.4 | 0.5 | 0.6 | 0.7 | 0.8 | 0.9 | 1.0 |
| 10 | 0.025 | O | O | × | | | | |
| | 0.050 | O | Δ | × | | | | |
| | 0.500 | O | O | O | × | | | |
| | 1.000 | O | O | Δ | × | | | |
| | 2.000 | O | × | | | | | |
| | 2.500 | Δ | × | | | | | |
| 15 | 0.025 | O | O | × | | | | |
| | 0.050 | O | O | O | O | Δ | × | |
| | 0.500 | O | O | O | O | O | × | |
| | 1.000 | O | O | O | O | O | Δ | × |
| | 2.000 | O | O | O | O | × | | |
| | 2.500 | O | O | O | × | | | |
| 30 | 0.025 | O | O | Δ | × | | | |
| | 0.050 | O | O | O | O | O | × | |
| | 0.500 | O | O | O | O | O | O | × |
| | 1.000 | O | O | O | O | O | Δ | × |
| | 2.000 | O | O | O | O | × | | |
| | 2.500 | O | O | O | × | | | |
| 60 | 0.025 | O | Δ | × | | | | |
| | 0.050 | O | O | O | O | Δ | × | |
| | 0.500 | O | O | O | O | O | × | |
| | 1.000 | O | O | O | O | O | Δ | × |
| | 2.000 | O | O | O | O | × | | |
| | 2.500 | O | O | × | | | | |

TABLE 5-continued

| $\frac{TiC + TiO_2}{Al_2O_3 + TiC + TiO_2} \times 100$ (% by weight) | $Y_2O_3$ (parts by weight) | feed f (mm/tooth) | | | | | | |
| --- | --- | --- | --- | --- | --- | --- | --- | --- |
| | | 0.4 | 0.5 | 0.6 | 0.7 | 0.8 | 0.9 | 1.0 |
| 70 | 0.025 | O | X | | | | | |
| | 0.050 | O | O | Δ | X | | | |
| | 0.500 | O | O | X | | | | |
| | 1.000 | O | O | O | X | | | |
| | 2.000 | O | Δ | X | | | | |
| | 2.500 | O | X | | | | | |

TABLE 6

| $\frac{TiC + TiO_2}{Al_2O_3 + TiC + TiO_2} \times 100$ (% by weight) | $\frac{TiO_2}{TiC + TiO_2}$ (% by weight) | feed f (mm/tooth) | | | | | | |
| --- | --- | --- | --- | --- | --- | --- | --- | --- |
| | | 0.4 | 0.5 | 0.6 | 0.7 | 0.8 | 0.9 | 1.0 |
| 10 | 4.0 | O | O | X | | | | |
| | 5.0 | O | O | X | | | | |
| | 7.5 | O | O | Δ | X | | | |
| | 10.0 | O | O | O | X | | | |
| | 12.5 | O | Δ | X | | | | |
| | 15.0 | O | O | O | X | | | |
| | 16.0 | O | Δ | X | | | | |
| 15 | 4.0 | O | O | O | O | Δ | X | |
| | 5.0 | O | O | O | O | O | X | |
| | 7.5 | O | O | O | O | O | Δ | X |
| | 10.0 | O | O | O | O | O | O | X |
| | 12.5 | O | O | O | O | O | O | X |
| | 15.0 | O | O | O | O | X | | |
| | 16.0 | O | O | O | Δ | X | | |
| 30 | 4.0 | O | O | O | O | O | X | |
| | 5.0 | O | O | O | O | O | Δ | X |
| | 7.5 | O | O | O | O | O | O | O |
| | 10.0 | O | O | O | O | O | O | O |
| | 12.5 | O | O | O | O | O | X | |
| | 15.0 | O | O | O | O | Δ | X | |
| | 16.0 | O | O | O | X | | | |
| 60 | 4.0 | O | O | O | O | Δ | X | |
| | 5.0 | O | O | O | O | O | X | |
| | 7.5 | O | O | O | O | O | O | X |
| | 10.0 | O | O | O | O | O | Δ | X |
| | 12.5 | O | O | O | O | Δ | X | |
| | 15.0 | O | O | O | O | X | | |
| | 16.0 | O | O | O | Δ | X | | |
| 70 | 4.0 | O | Δ | X | | | | |
| | 5.0 | O | O | O | X | | | |
| | 7.5 | O | O | O | Δ | X | | |
| | 10.0 | O | O | O | O | X | | |
| | 12.5 | O | O | O | O | X | | |
| | 15.0 | O | O | Δ | X | | | |
| | 16.0 | O | O | X | | | | |

(b) Evaluation although the influence in which the composition ratio or amount ratio of the raw material composition affects the hot press sintering in this hot pressing method is approximately the same as that of the HIP method, the following phenomenon is particularly directed to the hot press sintering method. Namely, when $TiO_2/(TiC+TiO_2)$ ($\times 100\%$) exceeds 15% by weight, the reaction between the sintered body and the graphite mold becomes remarkably active, so that the sintered body adheres to the mold. Therefore, the removal of the sintered body from the mold was extremely difficult, resulting in the rupture of the sintered body.

The sintered bodies prepared by the hot pressing have shown almost the same hardness and the tool life as those of the sintered bodies prepared by HIP.

As has been described heretofore, the sintered bodies produced by the method of this embodiment have shown excellent performance properties such as high hardness and high density when used as a cutting tool material. Furthermore, if the mean particle size of the sintered bodies is chosen so that the mean particle size is less than 4 μm and the maximum particle size is less than 10 m, while the hardness and the density are determined at more than $H_RA93.0$ and more than 98.5% of the theoretical density respectively, then the sintered bodies possesses especially improved performance properties.

Still furthermore, according to the method of this embodiment, since the sintering temperature can be greatly lowered, the sintered bodies can have constituent grains prepared as finely as possible, and the sintering operation can have improved operability.

SECOND EMBODIMENT

This embodiment relates to a sintered body and the method for producing the same which can resolve the aforementioned problems, wherein the subject matter of the invention lies a sintered body consisting essentially of:

(1) 100 parts by weight of titanium carbide, titanium oxide and aluminum oxide, the titanium carbide and titanium oxide accounting for 15 to 60 percent by weight, the amount of titanium oxide relative to the titanium carbide and titanium oxide being 5 to 15 percent by weight, (2) 0.039 to 1.575 parts by weight of yttrium, and (3) 0.1 to 1.0 parts by weight of at least one sintering aid selected from the group consisting of nickel oxide, molybdenum oxide, chromium oxide, cobalt oxide, magnesium oxide, iron oxide and manganese oxide, wherein the yttrium, titanium oxide and sintering aid exist in at least one of the following forms, (a) yttrium oxide, (b) a composition of yttrium oxide and titanium carbide, (c) a composition of yttrium oxide, titanium carbide and yttrium carbide, (d) a double carbide of titanium carbide and yttrium carbide, (e) a solid solution of aluminum oxide, yttrium oxide, titanium oxide and at least one of the sintering aids, (f) a composition of solid solution consisting of aluminum oxide, yttrium oxide, titanium oxide and at least one of the sintering aids and a double carbide of titanium carbide and yttrium carbide, (g) a composition of solid solution consisting of aluminum oxide, yttrium oxide, titanium oxide and at least one of the sintering aids and titanium cargide, (h) a composition of solid solution consisting of aluminum oxide, yttrium oxide, titanium oxide and at least one of the sintering aids and yttrium carbide, (i) a composition of solid solution consisting of aluminum oxide, yttrium oxide, titanium oxide and at least one of the sintering aids and a solid solution consisting of titanium oxide, yttrium carbide and titanium carbide and (j) a composition of solid solution consisting of aluminum oxide, yttrium oxide titanium oxide and at least one of the sintering aids and a solid solution consisting of titamium carbide and titanium oxide. A method for producing such a sintered body comprises, the following steps:

(1) preparing a green compact by molding a raw material mixture which contains (a) 100 parts by weight of titanium carbide, titanium oxide and aluminum oxide, the titanium carbide and titanium oxide accounting for 15 to 60 percent by weight and the aluminum oxide accounting for 85 to 40 percent by weight, the amount of titanium oxide relative to the titanium carbide and titanium oxide being 5 to 15 percent (b) 0.05 to 2.00 parts by weight of yttrium oxide, and (c) 0.1 to 1.0 parts by weight of at least one sintering aid selected from a group consisting of nickel oxide, molybdenum oxide, chromium oxide, cobalt oxide, magnesium oxide, iron oxide, and manganese oxide, (2) presintering the green compact in either a reducing or an inert gas atmosphere to produce a presintered compact which has a density of more then 94 percent of the theoretical density, and (3) subjecting the presintered compact to a hot isostatic pressing for effecting a sintering.

A method for producing such a sintered body also comprises the following steps:

(1) preparing a raw material mixture which contains (a) 100 parts by weight of titanium carbide, titanium oxide and aluminum oxide, the titanium carbide and titamium oxide accounting for 15 to 60 percent by weight and the aluminum oxide accounting for 85 to 40 percent by weight, said titanium oxide per titanium carbide and titanium oxide being 5 to 15 percent, (b) 0.05 to 2.00 parts by weight of yttrium oxide and (c) 0.1 to 1.0 parts by weight of at least sintering aid selected from a group consisting of nickel oxide, molybdenum oxide, chromium oxide, cobalt oxide, magnesium oxide, iron oxide and manganese oxide, and (2) subjecting said raw material mixture to a hot pressing for effecting a sintering.

In the abovementioned HIP method, the reason for conducting the presintering operation in either a reducing atmosphere or an inert gas (excluding nitrogen gas) atmosphere is that in an oxidizing atmosphere, TiC is undesirably converted to $TiO_2$ by oxidization, while in vacuum, $Al_2O_3$ is evaporated around 1450° C. making the production of dense sintered body impossible. Furthermore, in nitrogen gas atmosphere, the nitrogen reacts with the constituent grains of the sintered bodies thereby adversely transforming the composition of the final product.

The sintered bodies of this embodiment and the method for producing the same is hereinafter further explained in view of the following experiment.

<EXPERIMENT III>

(a) Manner of Experiment and the Result $\alpha$-$Al_2O_3$ having the purity of 99.9% and the mean particle size of 0.6 $\mu$m and TiC, $Y_2O_3$ and $TiO_2$ respectively having the purity of 99% and the mean particle size of 1 $\mu$m and oxides of nickel, molybdenum, chromium and magnesium having the purity of 99% and the mean particle size of 1 $\mu$m were mixed at various mixing ratio by wet ball milling for 20 hours. Subsequently water soluble wax was added to the mixture. The mixture was granulated and was molded at a pressure of 1.3 ton/cm$^2$ so that the cutting tool tip green compact having a square side of 13.0 mm and a thickness of 5 mm was formed after sintering. The molding pressure was more than 0.5 ton/cm$^2$ since it was experimentally proved that such pressure is necessary in the molding operation. The green compact which was formed in the above manner at room temperature was presintered in a furnace of argon gas atmosphere so that the presintered body could have a density of more than 94% of the theoretical density agter holding the compact for 1 hour at a temperature which falls in a range of from 1650° to 1950° C. after the furnace temperature reached such range.

Figure 22:
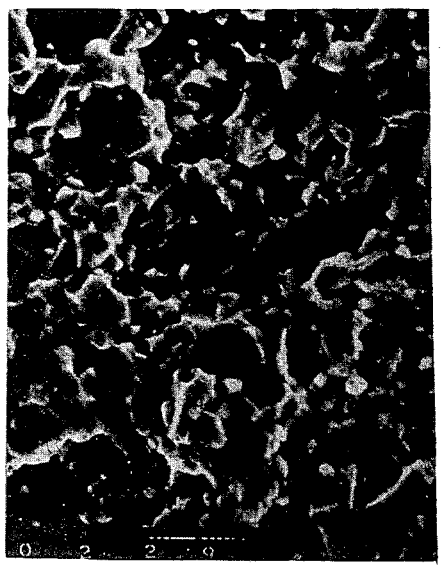
Figure 23:
Figure 21:
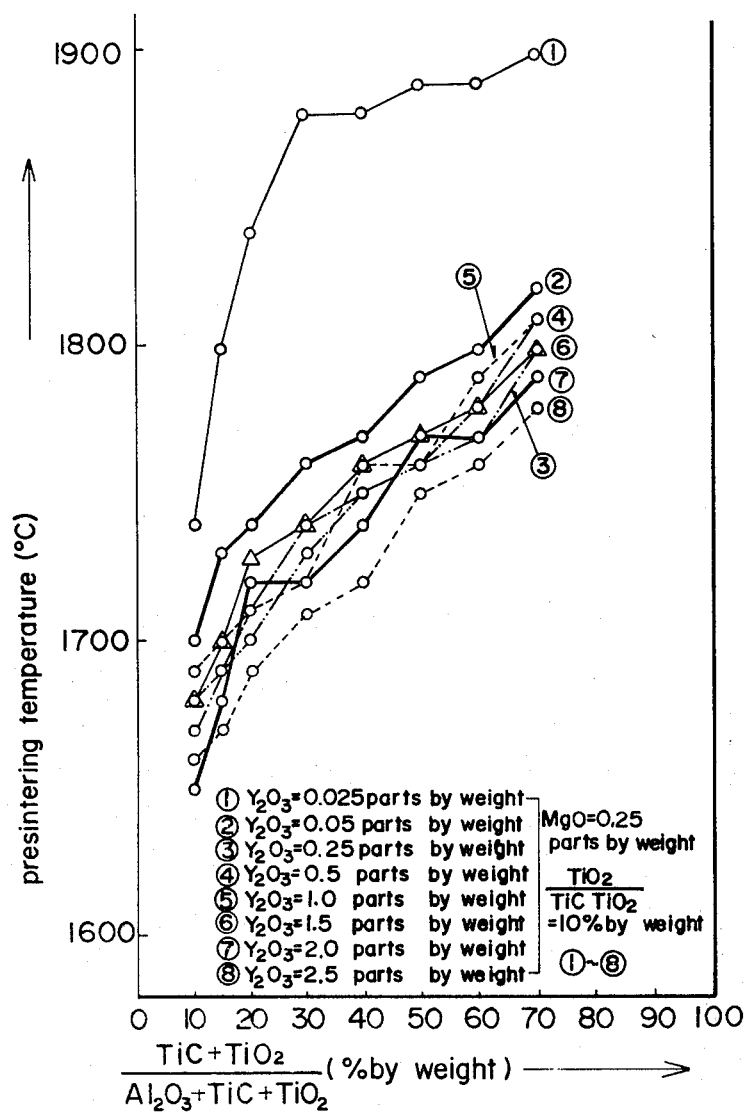

The relationship between the above holding temperature and the mixing ratio of the various compositions is shown in FIG. 21 while the electron photomicrograph of a representative sample which consists of 100 parts by weight of 70$Al_2O_3$-27TiC-3$TiO_2$, 0.5 parts by weight of $Y_2O_3$ and 0.25 parts by weight of MgO as shown on FIG. 22. Furthermore, for a comparison purposes, the electron photomicrograph of a presintered product having a density of more than 94% of the theoretical density which are prodiced by presintering 70$Al_2O_3$-30TiC composition (no $Y_2O_3$ included) at a holding temperature of 1900° C. for an hour is shown in FIG. 23.

Figure 24:
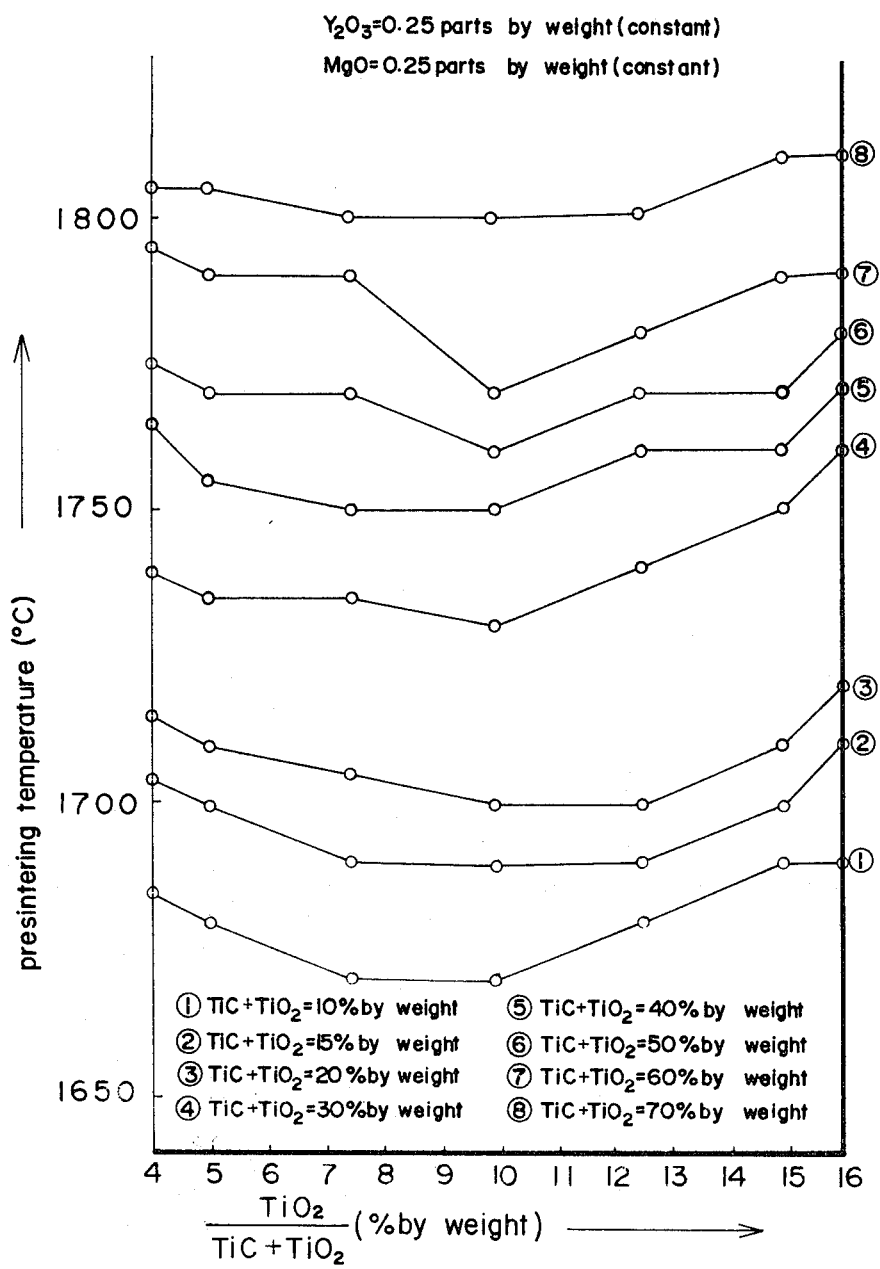

FIG. 24 shows the variations of presintering temperature when the $TiO_2/(TiC+TiO_2)$ value was varied.

Figure 25:
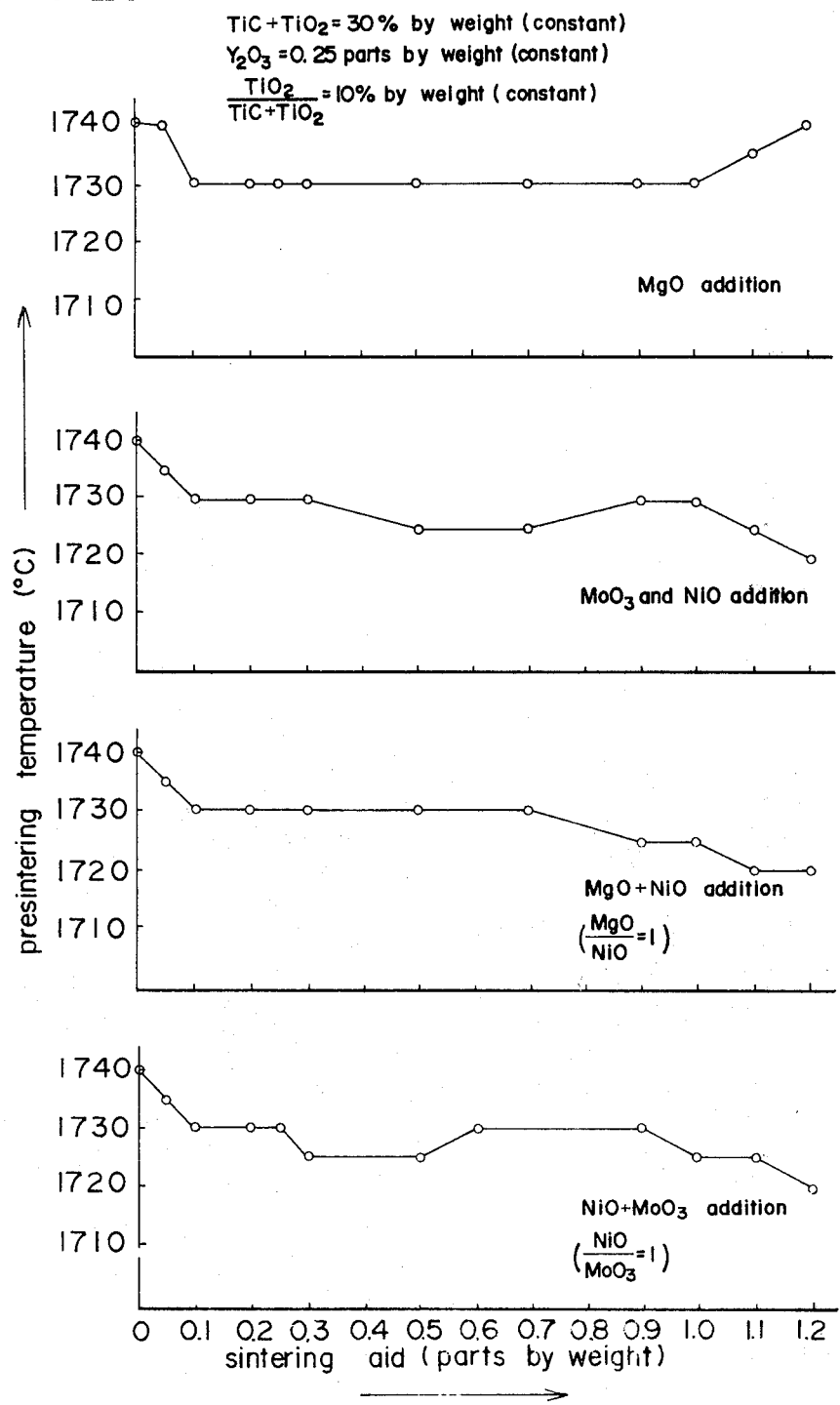

In FIG. 25, the temperature (holding time: 1 hour) necessary for presintering the green compact comprising 100 parts by weight of 70$Al_2O_3$-27T±C-3$TiO_2$, 0.25 parts by weight of $Y_2O_3$ and desired kinds of sintering aids so that the presintered compact has a density of more than 94% of the theoretical density is shown.

Figure 26:
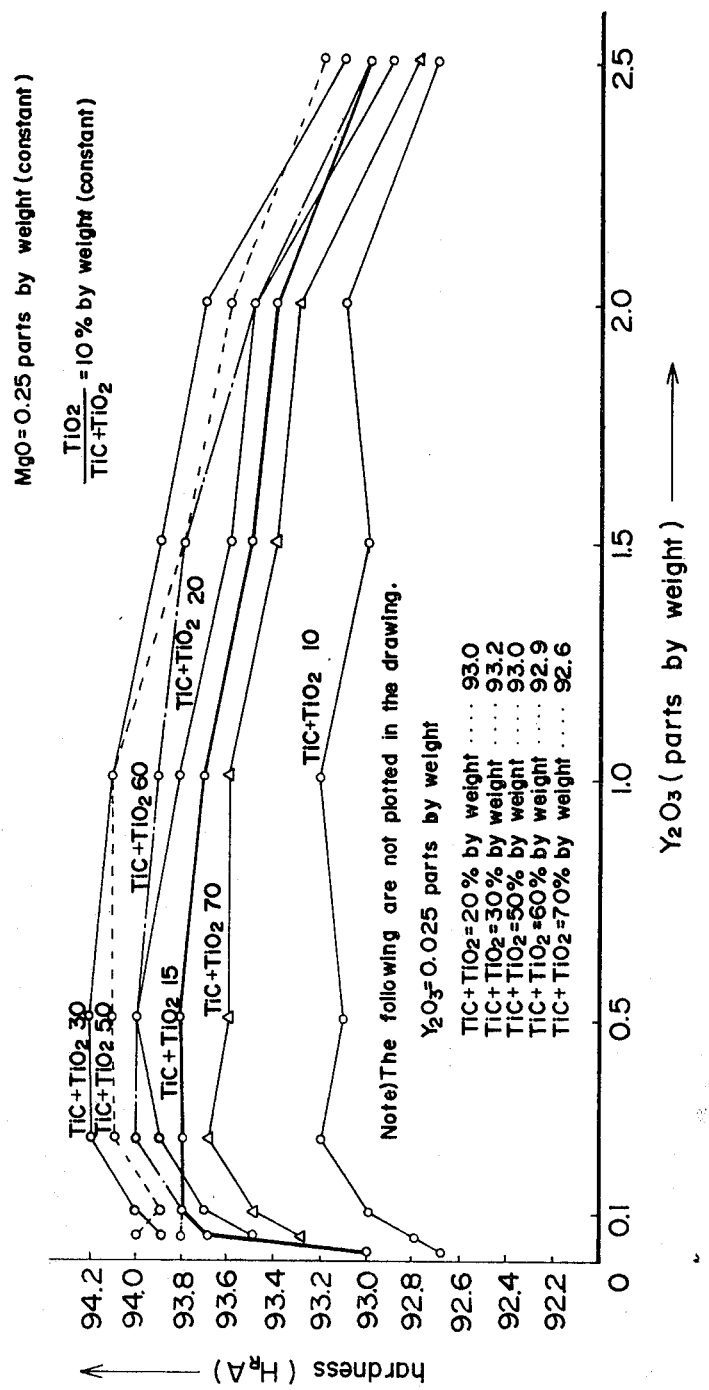
Figure 27:
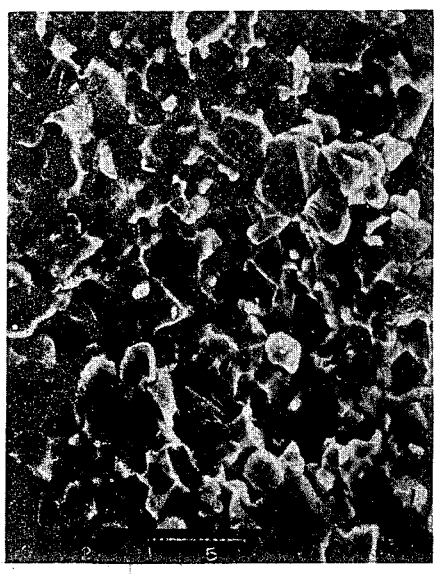

The presintered compact prepared in the above manner and having a density raging from 94% to 95% of the theoretical density was placed within a HIP furnace which included a high pressure vessel containing a molybdenum heat element. Then, the cutting tool tip presintered compact was subjected to a HIP treatment for one hour at a temperature of 1400° C. and under an high pressurized Argon gas atmosphere of 1000 kg/cm², thus producing the final sintered body. Subsequently, the sintered body was shaped by a diamond abrasive and the hardness (Rockwell A scale) of the ground sintered body was measured. The result of the measurement is shown in FIG. 26. The electron photomicrograph of the final sintered body after HIP treatment is shown in FIG. 27. The test piece of FIG. 27 was the compact which consists 100 parts by weight of 70Al₂O₃-27TiC-3TiO₂, 0.5 parts by weight of Y₂O₃ and 0.25 parts by weight of MgO.

Figure 29:
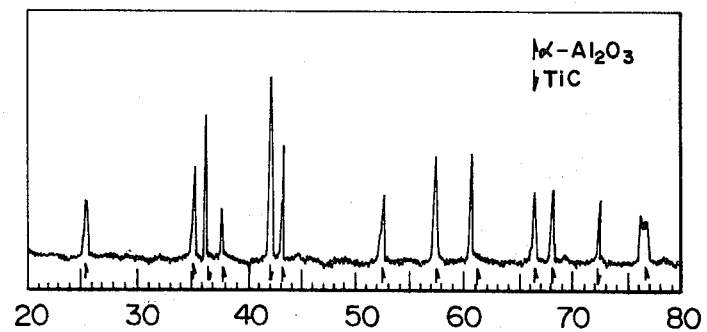
FIG. 21 to FIG. 36 are the graphs and electroscanning photomicrographs showing the results of the experiment III.
Figure 28:
Figure 30:
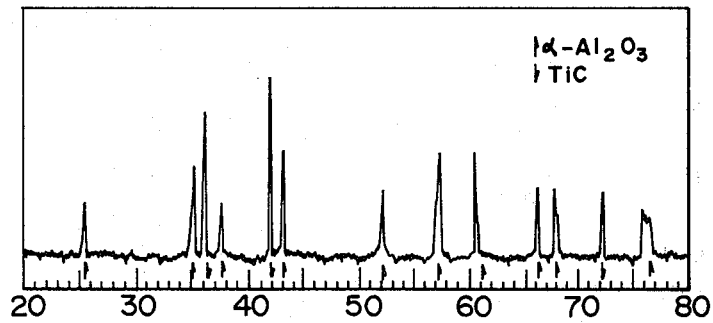

Furthermore, for comparison purposes, the electron photomicrograph of the sintered body which was produced by HIP treatment after presintering the 70Al₂O₃-30TiC (no Y₂O₃ included) composition so as to produce the presintered body having a density of more than 94% of the theoretical density is shown in FIG. 28. Furthermore, FIG. 29 and FIG. 30 show the photomicrographs obtained by X-rays micro-analizer analysis of the final sintered compacts prepared from the green compact consisting of 100 parts by weight of 70Al₂O₃-27TiC-3TiO₂, 0.5 parts by weight of Y₂O₃ and 0.25 parts by weight of MgO and the final sintered compacts prepared from the composition consisting of 70Al₂O₃-30TiC (no Y₂O₃ included).

Figure 31:
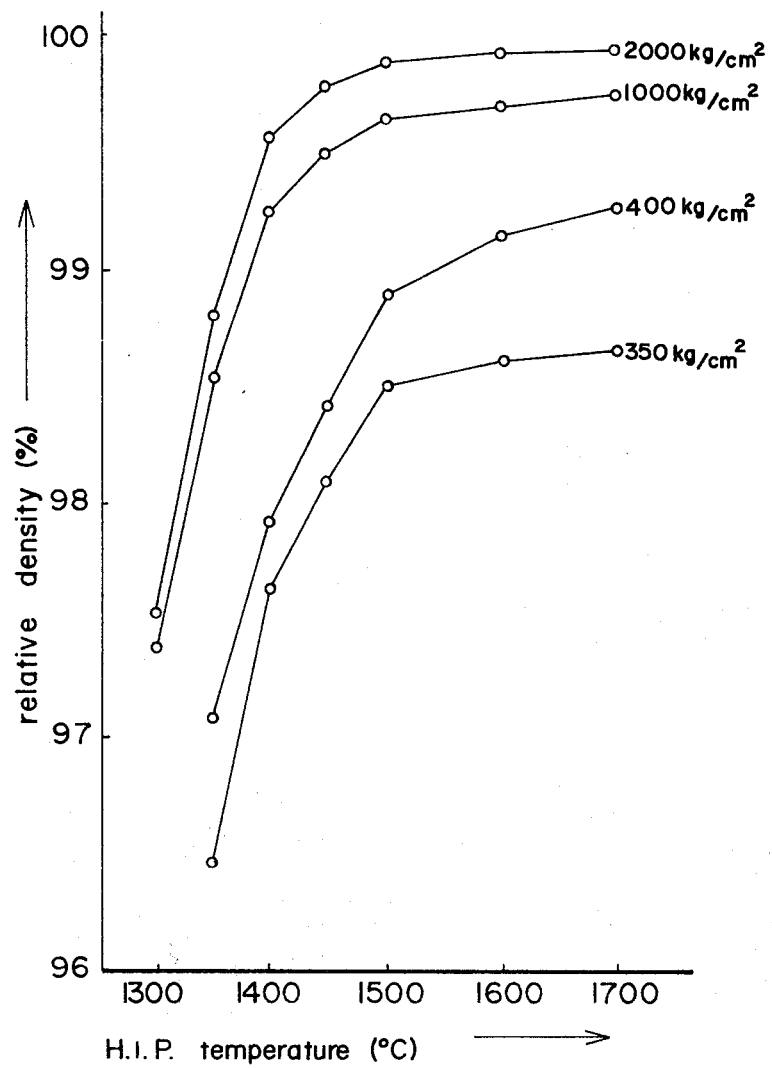

Furthermore, to obtain the conditions which provide efficient or advantageous HIP treatment, the variation of the density of final sintered compact relative to the theoretical density was checked by varying the sintering temperature and sintering pressure in the HIP treatment. Namely, the presintered body which was prepared by presintering the composition consisting 100 parts by weight of 70Al₂O₃-27TiC-3TiO₂, 0.5 parts by weight of Y₂O₃ and 0.25 parts by weight of MgO was placed within a HIP furnace. Then, the presintered body was subjected to HIP treatment under an Argon gas atmosphere for one hour with varied temperatures and the pressure wherein the temperature was varied in a range of from 1300° C. to 1700° C. and the pressure was chosen at 350 kg/cm², 400 kg/cm², 1000 kg/cm² and 2000 kg/cm² respectively. Subsequently, the pressure in the furnace was gradually released and the furnace was gradually cooled. The results of the above experiment are shown in FIG. 31.

Figure 32:
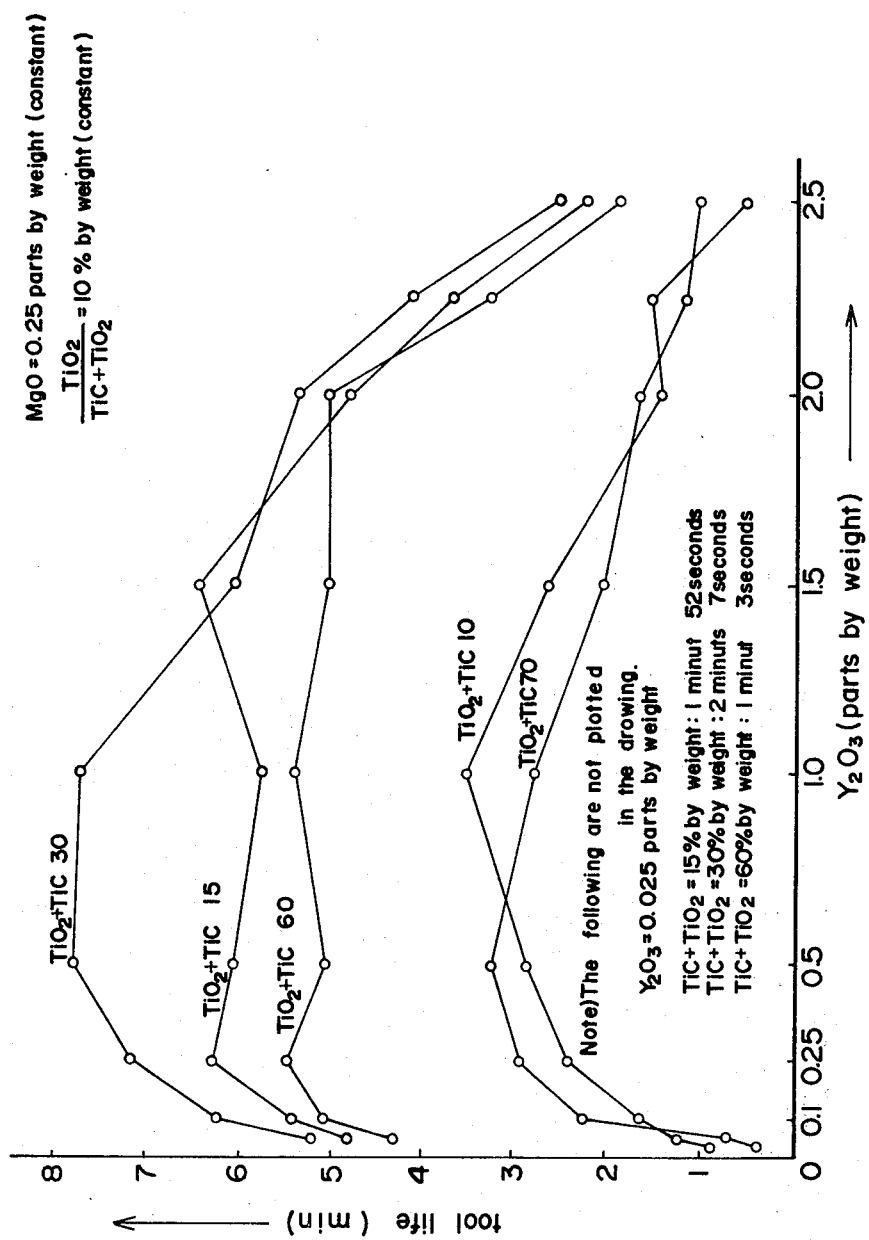
Figure 33:
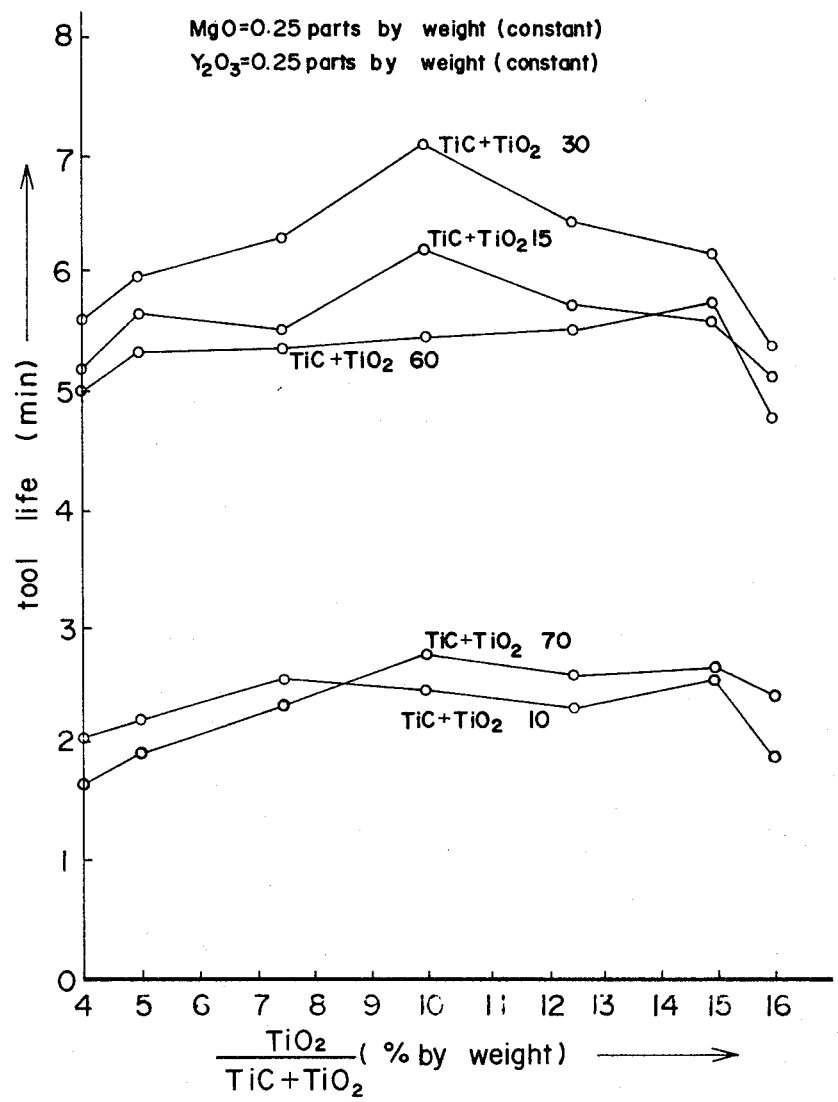
Figure 34:
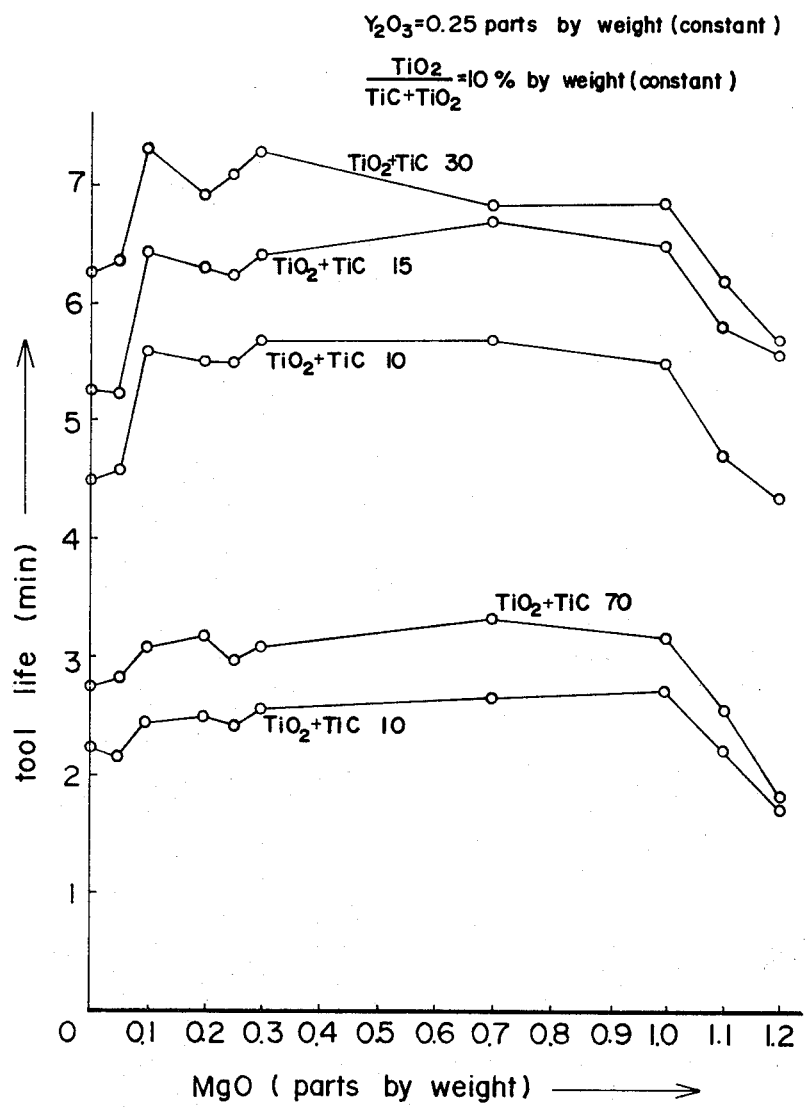
Figure 35:
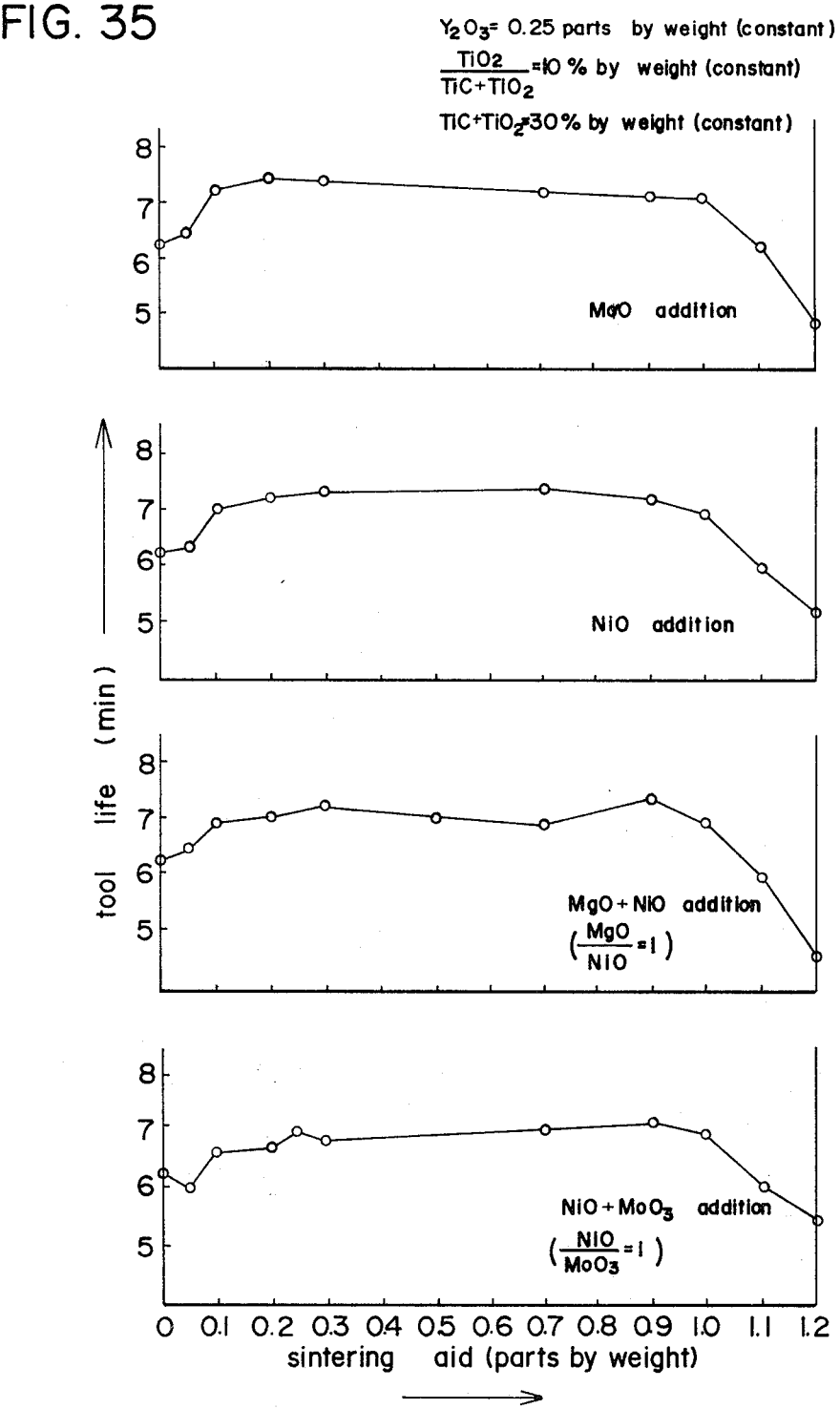
Figure 36:
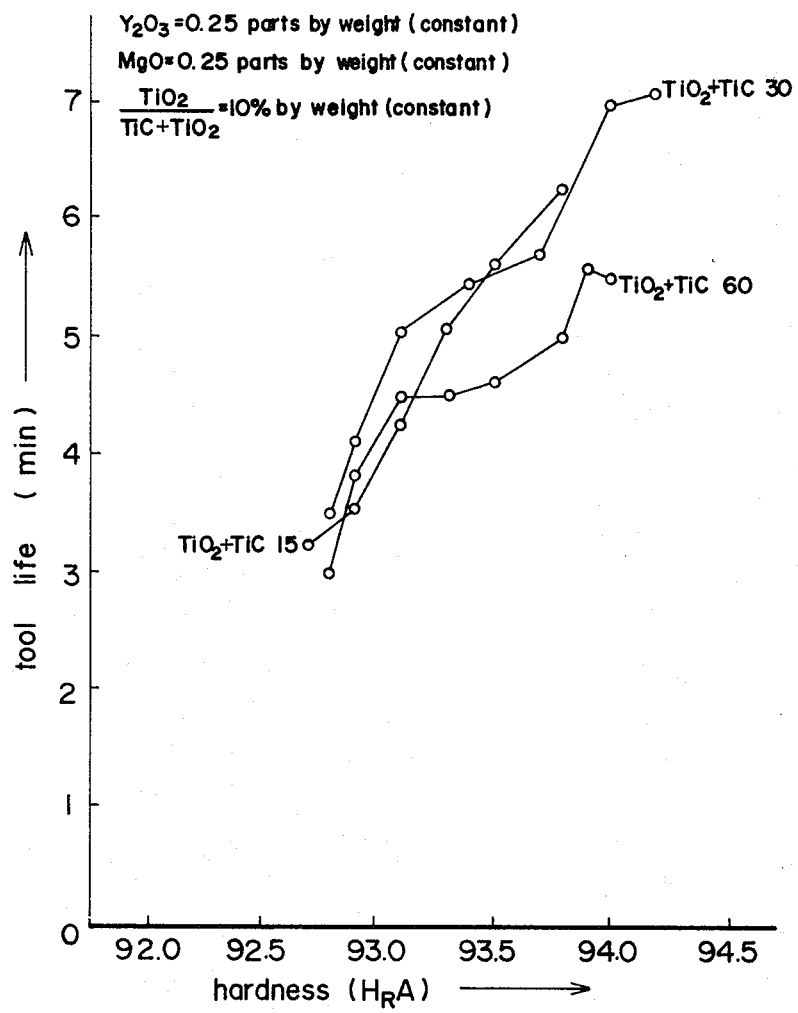

Furthermore, presintered bodies having a density of 94 to 95% of the theoretical density and prepared from green compacts of various composition ratios were placed within the HIP furnace and were sintered under a pressurized argon gas atmosphere at 1400° C. for 1 hr and at 1000 kg/cm², thus producing the final sintered bodies having a density of more than 99% of the theoretical density. Such final sintered bodies were shaped to a cutting tool style SNGN432, having a chamfer of 0.1×30°. Such shaped or processed bodies were used in cutting performance tests to evaluate the cutting performance. The cutting conditions were as follows:

Continuous Cutting Test work piece: high-hardened steel SNGN-8 (hardness Hs 85)
cutting condition: V×d×f=50 m/min×0.5 mm×0.2 mm/rev
tool life evaluation: width of flank wear 0.3 mm The results of the continuous cutting test are shown in FIG. 32 and FIG. 33. FIG. 34 shows the influence of MgO addition on the sintered compacts, under the same cutting conditions, which was produced in such a manner that the green compacts containing a constant 0.25 part by weight of Y₂O₃ and varying amounts of MGO were presintered and the presintered compacts having a density of more than 94.0% of the theoretical density were subsequently sintered to produce sintered compacts having a density of more than 99.0% of the theoretical density. FIG. 35 shows the influence of the addition of other sintering aids. Furthermore, the relationship between the hardness and the tool life is shown in FIG. 36.

Chipping-resistant Cutting Test work piece: cast iron FC25
cutting condition: V×d=245 m/min×1.5 mm
tool life evaluation: Milling was conducted with the above conditions while changing the feed per tooth (mm/tooth) from 0.4 to 0.5, 0.6, 0.7, 0.8, 0.9 and 1.0 and the tool life was judged when the chipping occurred on the cutting edge.

The results of the chipping-resistant cutting test in which the value of TiO₂/(TiC+TiO₂) was held constant at 10 percent by weight and MgO was held constant at 0.25 parts byweight are shown in Table 7 while the results of the same test in which Y₂O₃ was held constant at 0.25 parts by weight and MgO was held constant at 0.25 parts by weight are shown in Table 8. Furthermore, the results of the same test in which the value of TiO₂/(TiC+TiO₂) was held constant at 10% by weight while MgO was varied are shown in Table 9. In Tables 7, 8 and 9, marks "O" indicate that no chipping occurred in two trails, marks "Δ" indicate that chipping occurred in one trial and marks "×" indicate that chipping occurred in both trials.

TABLE 7

| $\frac{TiC + TiO_2}{Al_2O_3 + TiC + TiO_2} \times 100$ (% by weight) | Y₂O₃ (parts by weight) | feed f (mm/tooth) | | | | | | |
|---|---|---|---|---|---|---|---|---|
| | | 0.4 | 0.5 | 0.6 | 0.7 | 0.8 | 0.9 | 1.0 |
| 10 | 0.025 | O | × | | | | | |
| | 0.050 | O | O | × | | | | |
| | 0.500 | O | Δ | × | | | | |
| | 1.000 | O | Δ | × | | | | |
| | 2.000 | O | × | | | | | |
| | 2.500 | O | × | | | | | |
| 15 | 0.025 | O | O | O | × | | | |
| | 0.050 | O | O | O | O | Δ | × | |
| | 0.500 | O | O | O | O | O | O | × |
| | 1.000 | O | O | O | O | O | O | × |
| | 2.000 | O | O | O | O | O | Δ | × |
| | 2.500 | O | O | O | Δ | × | | |
| 30 | 0.025 | O | O | O | × | | | |

TABLE 7-continued

| $\frac{TiC + TiO_2}{Al_2O_3 + TiC + TiO_2} \times 100$ (% by weight) | $Y_2O_3$ (parts by weight) | feed f (mm/tooth) | | | | | | |
|---|---|---|---|---|---|---|---|---|
| | | 0.4 | 0.5 | 0.6 | 0.7 | 0.8 | 0.9 | 1.0 |
| | 0.050 | O | O | O | O | O | O | × |
| | 0.500 | O | O | O | O | O | O | O |
| | 1.000 | O | O | O | O | O | O | × |
| | 2.000 | O | O | O | O | O | Δ | × |
| | 2.500 | O | O | × | | | | |
| 60 | 0.025 | O | O | × | | | | |
| | 0.050 | O | O | O | O | O | Δ | × |
| | 0.500 | O | O | O | O | O | O | × |
| | 1.000 | O | O | O | O | O | O | × |
| | 2.000 | O | O | O | O | Δ | × | |
| | 2.500 | O | Δ | Δ | × | | | |
| 70 | 0.025 | O | Δ | × | | | | |
| | 0.050 | O | O | Δ | × | | | |
| | 0.500 | O | O | O | × | | | |
| | 1.000 | O | O | × | | | | |
| | 2.000 | O | Δ | × | | | | |
| | 2.500 | O | × | | | | | |

TABLE 8

| $\frac{TiC + TiO_2}{Al_2O_3 + TiC + TiO_2} \times 100$ (% by weight) | $\frac{TiO_2}{TiC + TiO_2}$ (% by weight) | feed f (mm/tooth) | | | | | | |
|---|---|---|---|---|---|---|---|---|
| | | 0.4 | 0.5 | 0.6 | 0.7 | 0.8 | 0.9 | 1.0 |
| 10 | 4.0 | O | Δ | × | | | | |
| | 5.0 | O | O | Δ | × | | | |
| | 7.5 | O | O | O | × | | | |
| | 10.0 | O | O | O | × | | | |
| | 12.5 | O | O | Δ | × | | | |
| | 15.0 | O | O | Δ | × | | | |
| | 16.0 | O | Δ | × | | | | |
| 15 | 4.0 | O | O | O | O | O | × | |
| | 5.0 | O | O | O | O | O | O | × |
| | 7.5 | O | O | O | O | O | O | O |
| | 10.0 | O | O | O | O | O | O | Δ |
| | 12.5 | O | O | O | O | O | O | × |
| | 15.0 | O | O | O | O | O | × | |
| | 16.0 | O | O | O | O | × | | |
| 30 | 4.0 | O | O | O | O | O | O | × |
| | 5.0 | O | O | O | O | O | O | Δ |
| | 7.5 | O | O | O | O | O | O | O |
| | 10.0 | O | O | O | O | O | O | O |
| | 12.5 | O | O | O | O | O | Δ | Δ |
| | 15.0 | O | O | O | O | O | O | × |
| | 16.0 | O | O | O | O | Δ | × | |
| 60 | 4.0 | O | O | O | O | O | × | |
| | 5.0 | O | O | O | O | O | O | × |
| | 7.5 | O | O | O | O | O | O | O |
| | 10.0 | O | O | O | O | O | O | Δ |
| | 12.5 | O | O | O | O | O | Δ | × |
| | 15.0 | O | O | O | O | O | Δ | × |
| | 16.0 | O | O | O | O | Δ | × | |
| 70 | 4.0 | O | O | Δ | × | | | |
| | 5.0 | O | O | O | O | × | | |
| | 7.5 | O | O | O | O | × | | |
| | 10.0 | O | O | O | Δ | × | | |
| | 12.5 | O | O | O | O | × | | |
| | 15.0 | O | O | Δ | × | | | |
| | 16.0 | O | O | × | | | | |

TABLE 9

| $\frac{TiC + TiO_2}{Al_2O_3 + TiC + TiO_2} \times 100$ (% by weight) | MgO (parts by weight) | feed f (mm/tooth) | | | | | | |
|---|---|---|---|---|---|---|---|---|
| | | 0.4 | 0.5 | 0.6 | 0.7 | 0.8 | 0.9 | 1.0 |
| 10 | 0.05 | O | O | O | × | | | |
| | 0.10 | O | O | O | Δ | × | | |
| | 0.30 | O | O | O | O | × | | |
| | 0.70 | O | O | O | O | Δ | × | |
| | 1.00 | O | O | O | O | × | | |
| | 1.20 | O | O | O | × | | | |
| 15 | 0.05 | O | O | O | O | O | O | × |
| | 0.10 | O | O | O | O | O | O | Δ |
| | 0.30 | O | O | O | O | O | O | O |
| | 0.70 | O | O | O | O | O | Δ | × |

TABLE 9-continued

| $\frac{TiC + TiO_2}{Al_2O_3 + TiC + TiO_2} \times 100$ (% by weight) | MgO (parts by weight) | feed f (mm/tooth) | | | | | | |
|---|---|---|---|---|---|---|---|---|
| | | 0.4 | 0.5 | 0.6 | 0.7 | 0.8 | 0.9 | 1.0 |
| | 1.00 | O | O | O | O | O | O | × |
| | 1.20 | O | O | O | O | O | O | × |
| 30 | 0.05 | O | O | O | O | O | O | Δ |
| | 0.10 | O | O | O | O | O | O | × |
| | 0.30 | O | O | O | O | O | O | O |
| | 0.70 | O | O | O | O | O | O | × |
| | 1.00 | O | O | O | O | O | O | × |
| | 1.20 | O | O | O | O | O | Δ | × |
| 60 | 0.05 | O | O | O | O | O | O | × |
| | 0.10 | O | O | O | O | O | O | Δ |
| | 0.30 | O | O | O | O | O | O | O |
| | 0.70 | O | O | O | O | O | O | Δ |
| | 1.00 | O | O | O | O | O | O | × |
| | 1.20 | O | O | O | O | O | Δ | × |
| 70 | 0.05 | O | O | O | × | | | |
| | 0.10 | O | O | O | Δ | × | | |
| | 0.30 | O | O | O | O | × | | |
| | 0.70 | O | O | O | O | × | | |
| | 1.00 | O | O | O | × | | | |
| | 1.20 | O | O | O | Δ | × | | |

Furthermore, to check the influence of the presintering atmosphere, the composition comprising 100 parts by weight of 70Al$_2$O$_3$-27TiC-3TiO$_2$, 0.25 parts by weight of Y$_2$O$_3$ and 0.25 parts by weight of MgO was presintered while varying the sintering atmosphere, thus producing presintered compacts having a density of more than 94 to 95% of the theoretical density. Subsequently, the presintered compacts were treated by the HIP method under a pressurized argon gas atmosphere at 1400° C. for 1 hr and at 1000 kg/cm$^2$. The relative density and the hardness of the final sintered compacts are both shown in Table 10.

TABLE 10

| Presintering Atmosphere | | Ar | CO | H$_2$ |
|---|---|---|---|---|
| Presintering temperature at least necessary to make the relative density more than 94 to 95% (° C.) | | 1730 | 1740 | 1740 |
| Sintering the presintered body at 1400° C. and 1000 kg/cm$^2$ | relative density (%) | 99.25 | 99.3 | 99.4 |
| | hardness (H$_{RA}$) | 94.2 | 94.1 | 94.0 |

EVALUATION

From FIG. 21 and FIG. 24, which show the relationship between the temperature and the raw material compositions for obtaining presintered bodies having the relative dendity necessary for applying the HIP method, it was found that (1) when TiO$_2$/(TiC+TiO$_2$) (×100%) is less than 5% by weight, the effect of TiO$_2$ on the improvement of sintering degreases and the presintering temperature rises. The same holds true for the case in which TiO$_2$/(TiC+TiO$_2$) (×100%) exceeds more than 15% by weight. It is considered that so long as TiO$_2$/(TiC+TiO$_2$) (×100%) is below 15% by weight, TiO$_2$ plays a significant rolw in improving the sinterability by reacting with free carbon in TiC material and other components. However when TiO$_2$/(TiC+TiO$_2$) exceeds 15% by weight, TiC is oxidized, thereby making the TiC constituent particles brittle. It was also found that compared to the presintered body which contains no Y$_2$O$_3$, the presintering temperature is lowered corresponding to the increase of the addition of Y$_2$O$_3$. However, so long as Y$_2$O$_3$ accounts for less than 0.05 parts by weight, the lowering of the presintering temperature is not sufficient, thereby the constituent grains of the presintered body cannot be made fine.

From FIG. 22 it is observed that the presintered body containing the suitable amount, namely 0.5 parts by weight of Y$_2$O$_3$, can have uniform and minute grain or structure.

Referring to the hardness of the final sintered body, as can be observed in FIG. 26, the sintered body containing 0.025 parts by weight of Y$_2$O$_3$ exhibits a certain degree of hardness increase compared to the sintered compacts containing no Y$_2$O$_3$. However, as described above, since such a sintered compact lacks presinterability, the constituent grains grew to a certain extent. Therefore the hardness thereof was insufficient, namely less than H$_{RA}$ 93.0. Whereas, when the Y$_2$O$_3$ addition account for more than 0.05 parts by weight, the constituent grain become fine. Therefore the hardnest of the sintered compact becomes more than H$_{RA}$ 93.0 provided that TiC and TiO$_2$ amounts fall in the preferred range of this invention. FIG. 27 and FIG. expressly show that the sintered body according to this invention has extremely minute grain structure compared to the grain structure of the conventional sintered body (FIG. 28).

Furthermore, judging from FIG. 34 and FIG. 35 which show the variation of the presintering temperature and the tool life corresponding to the variation of the addition of a sintering aid such as MgO, the following phenomena were observed.

Namely, it was found that the sintering aid should comprise more than 0.1 parts by weight, while an excessive amount of sintering aid adversely influences the sintered compacts. Accordingly, the optimal value for the addition of sintering aid should preferably fall in a range from 0.1 to 1.0 parts by weight. Although no data are disclosed, it was also confirmed from other experiments that the oxides of chromium, cobalt, iron and manganese also have exhibited sintering-promoting action and the requisite grain-growth restricting action.

Judging from the graph of FIG. 31 which shows HIP conditions, in order to obrain the final sintered body having a density of more than 98.5% gy weight of the theoretical density, it is desirable that the sintering pressure is determined in a range from 1000 to 2000 kg/cm$^2$, since sintering at low pressure requires an extremely high sintering temperature. Although not shown in the graph, it was experimentally found that when the sintering is conducted at about 1700° C., the period for sintering can be shortened to about 20 minutes, thereby restricting the growth of the constituent grains.

In utilizing the product of this invention as the cutting tool, the influence of composition distribution and hardness which affect the life of the cutting tool is shown in FIG. 12, FIG. 13 and FIG. 14. It was found from these graphs that when the $Y_2O_3$ amount is less than 0.05 parts by weight, the tool life is extremely shortened, while when the $Y_2O_3$ amount exceeds 2 parts by weight, the tool life is still shortened. It was also found that the tool life is closely related to the hardness of the sintered body. In general the harder the tool, the longer the tool life. When $TiO_2/(TiC+TiO_2)$ ($\times 100\%$) is less than 5 weight % and above 15 weight %, the tool life is shortened. When $TiC+TiO_2$ ia less than 15 weight %, $Al_2O_3$ tends to foster the growth of the grains thereof whereas when $TiC+TiO_2$ increases up to about 70 weight %, TiC produces the growth of grains thereof. It is understood that in both cases, the tool life is shortened. If the hardness is more than $H_RA$ 93.0, judging from FIG. 33, the tool life is more than 4 minutes, which is sufficient as tool life in view of the extremely severe cutting conditions which have been shown previously.

From Table 7 and Table 8 which show the chipping resistance of the cutting tool, it was found that when $TiC+TiO_2$ is either 10 weight % or 70 weight %, the sintered products exhibit poor performances, while the $Y_2O_3$ amount ahould preferably fall in a range from 0.05 to 2.00 parts by weight. Since the presintering atmosphere does not change in any noticeable manner even when any gas is selected from a group consisting of Ar gas, Co gas and $H_2$ gas for presintering purposes, Ar gas was used in the experiment in view of safety and economy.

EXPERIMENT IV

(a) Experimental Procedure and Results $\alpha$-$Al_2O_3$ having a purity of 99.9% and a mean particle size of 0.6 $\mu$m, TiC, $TiO_2$ abd $Y_2O_3$ having a purity of 99% mean particle size of 1 $\mu$m and a sintering aid such as MgO having the purity of 99% and the mean particle size of 1 $\mu$m were mixed in various mixing ratios by wet ball milling for 20 hours. The mixture was then sufficiently dried to prepare the sintering raw material. The raw material was packed in a graphite crucible having a size of 50 mm$\times$50 mm square and 60 mm high. A graphite crucible was inserted in a high frequency coil and the pressure within the crucible was raised up to 200 kg/cm$^2$ at various temperatures which fall in a range from 1350° C. to 1850° C. Such a condition was held for 60 minutes. Subsequently, the pressure was released from the crucible and the crucible was gradually cooled producing a sintered body having the size of a 50$\times$50$\times$5.5 mm cube.

The hot press temperature for sintering compact so that the sintered compact could have a density at least more than 98.5% of the theoretical density is shown in Table 11, provided that the pressure was 200 kg/cm$^2$, the holding time was 60 minutes, the $TiO_2/(TiC+TiO_2)$ ($\times 100\%$) was 10% by weight and the MgO amount was 0.25 parts by weight.

Figure 37:
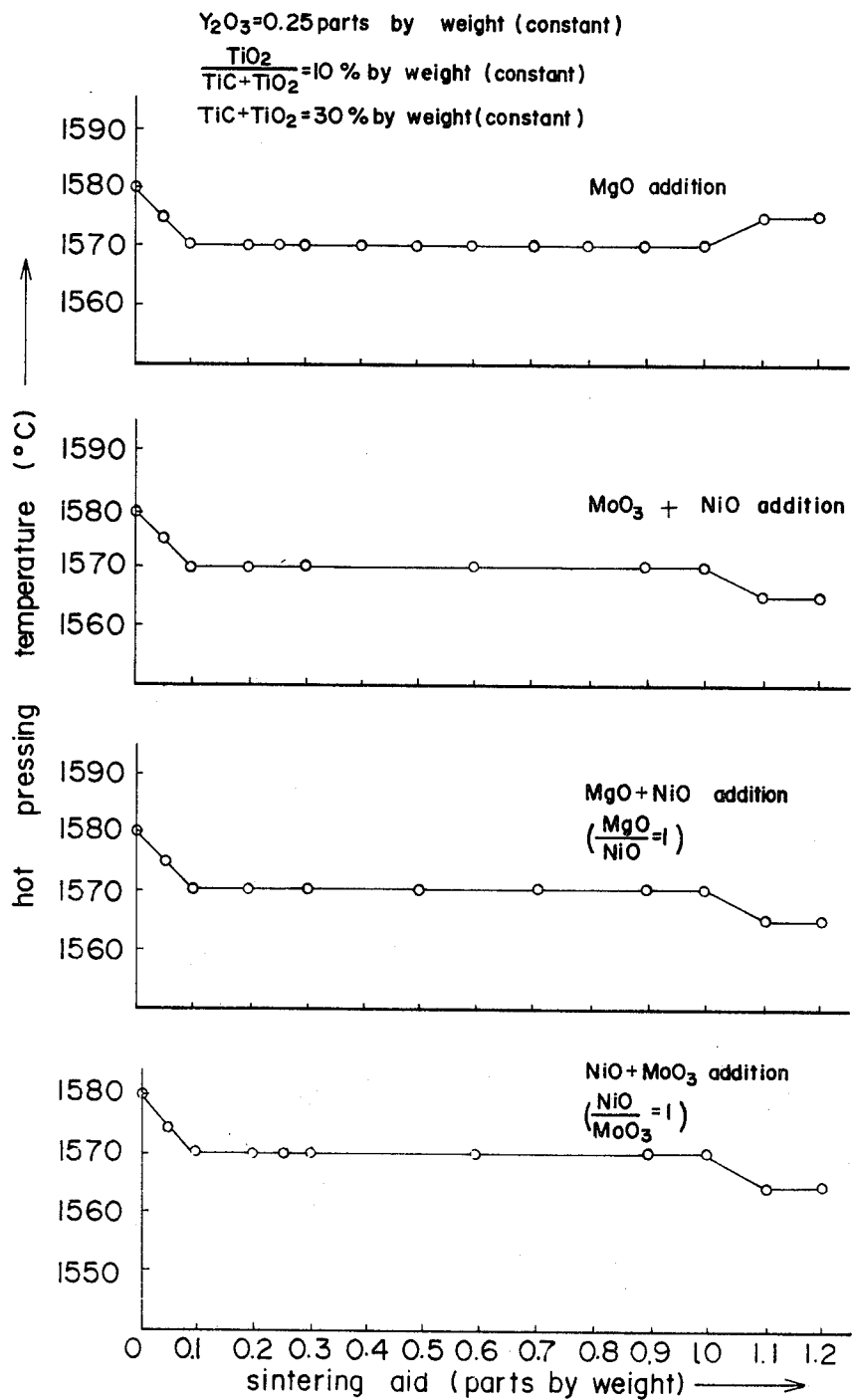

Subsequently, the variation of the lowest hot press temperature for sintering the green compact consisting of 100 parts by weight of $70Al_2O_3$-$27TiC$-$3TiO_2$ composition, 0.25 parts by weight of $Y_2O_3$, and the desired kind of sintering aids at 200 kg/cm$^2$ for 60 minutes, thus producing sintered compacts having a density of more than 98.5% of the theoretical density is shown in FIG. 37.

TABLE 11

| $Y_2O_3$ (parts by weight) | $\dfrac{TiC + TiO_2}{Al_2O_3 + TiC + TiO_2} \times 100$ (% by weight) | | | | | | | |
|---|---|---|---|---|---|---|---|---|
| | 10 | 15 | 20 | 30 | 40 | 50 | 60 | 70 |
| 0.025 | 1470 | 1520 | 1670 | 1730 | 1780 | 1790 | 1800 | 1820 |
| 0.050 | 1410 | 1430 | 1440 | 1570 | 1630 | 1670 | 1730 | 1740 |
| 0.250 | 1410 | 1420 | 1430 | 1570 | 1620 | 1660 | 1730 | 1740 |
| 0.500 | 1400 | 1420 | 1420 | 1560 | 1620 | 1660 | 1720 | 1730 |
| 1.000 | 1400 | 1420 | 1420 | 1550 | 1620 | 1650 | 1720 | 1730 |
| 1.500 | 1400 | 1410 | 1410 | 1550 | 1610 | 1650 | 1710 | 1730 |
| 2.000 | 1390 | 1410 | 1410 | 1540 | 1610 | 1640 | 1710 | 1730 |
| 2.500 | 1390 | 1410 | 1410 | 1540 | 1620 | 1640 | 1700 | 1720 |

Figure 38:
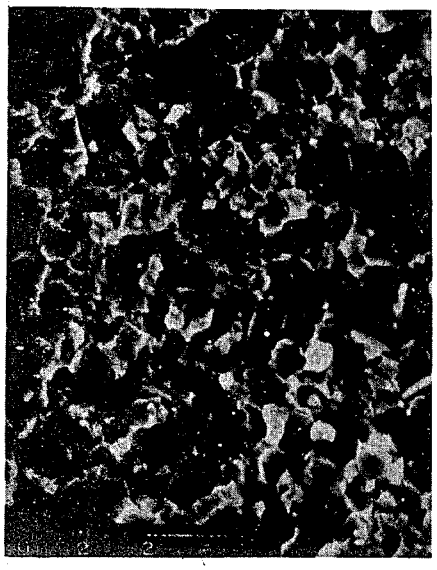
FIG. 37 to FIG. 46 are graphs and electroscanning photomicrographs showing the result of the experiment IV. In all microphotographs, the magnification rate is ×3000.
Figure 39:
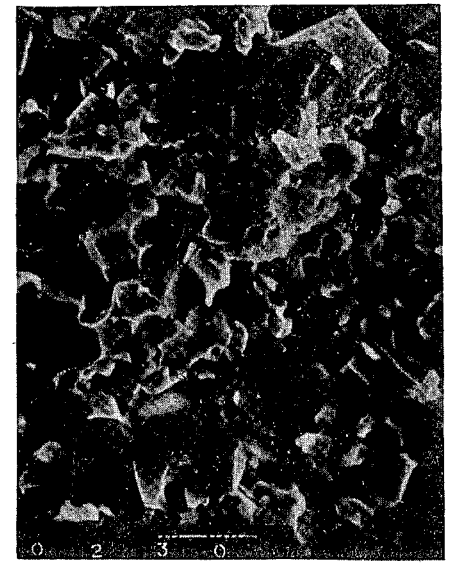
Figure 41:
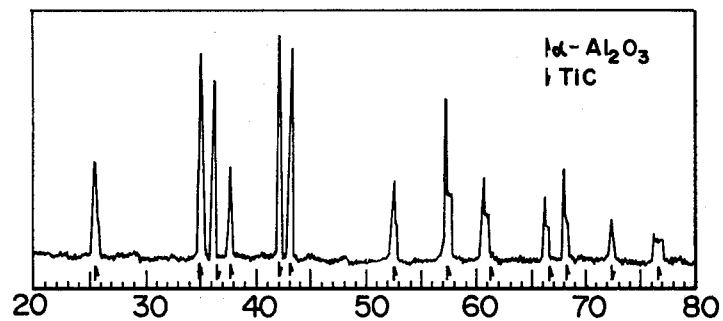
Figure 40:
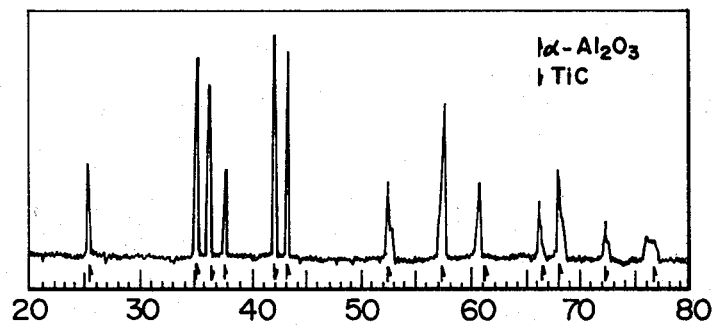

Additionally, electron photomicrographs of the sintered bodies which were obtained by the composition consisting of 100 parts by weight of $70Al_2O_3$-$27TiC$-$3TiO_2$, 0.5 parts by weight of added $Y_2O_3$ and 0.25 parts by weight of added MgO and the composition consisting of $70Al_2O_3$-$30TiC$ (no $Y_2O_3$ being included) are shown in FIG. 38 and FIG. 39, while the X-ray refraction microphotographs of these sintered bodies are shown in FIG. 40 and FIG. 41 respectively. The hot pressing conditions were 1560° C. for 60 minutes and 200 kg/cm$^2$ as to the sintered body containing $Y_2O_3$, while the conditions were 1750° C. for 60 minutes and 200 kg/cm$^2$ for the body containing no $Y_2O_3$.

Subsequently, the sintered body obtained in the above manner was cut by a diamond cutting wheel and abrasive then a tool having the cutting tool style SNGN432 and a chamfer of 0.1$\times$30° was produced. The results on hardness measurement (Rockwell Hardness A scale) conducted on respective cutting tools are almost the same as the hardness measurement results obtained in the HIP operation.

Figure 42:
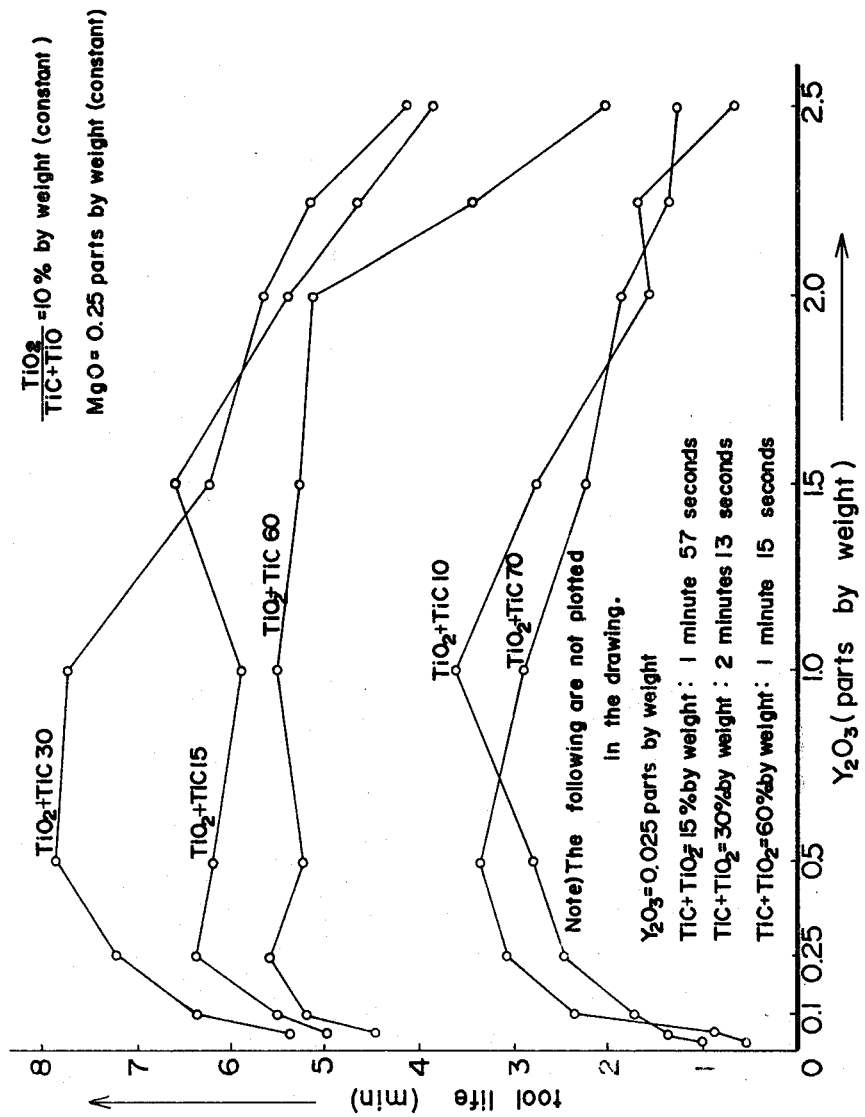
Figure 43:
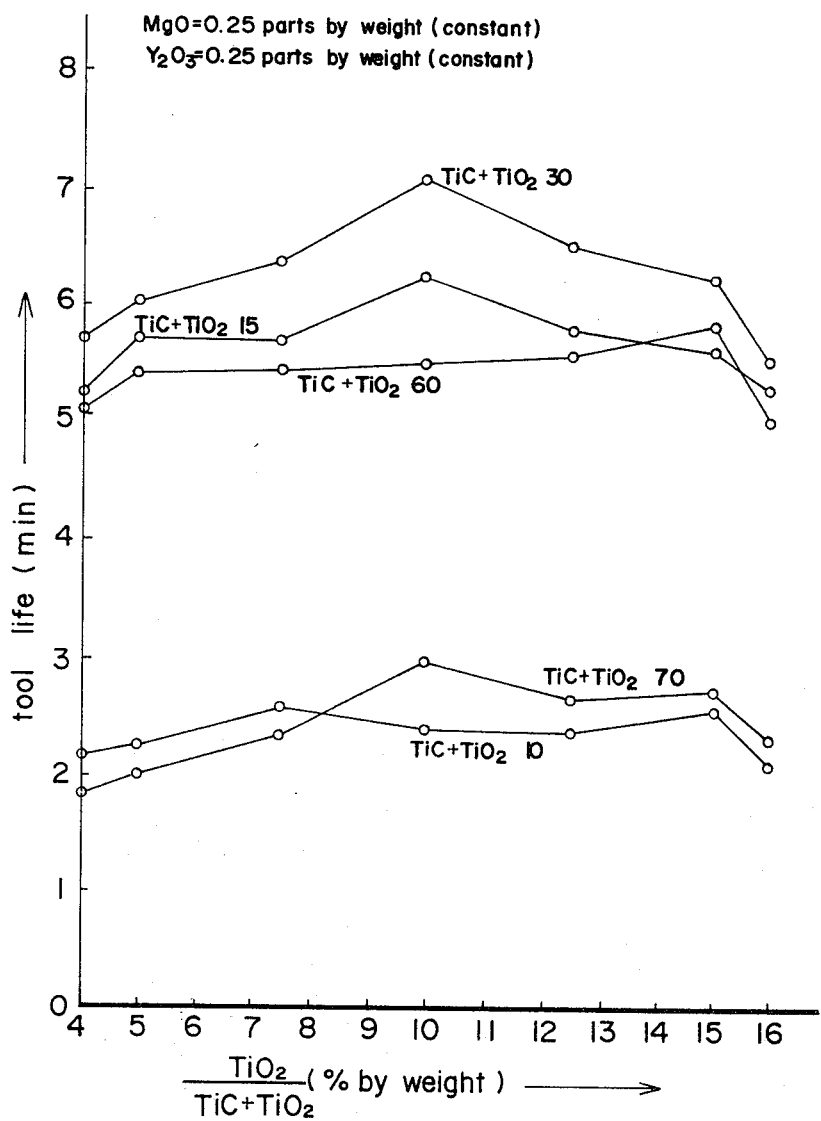
Figure 44:
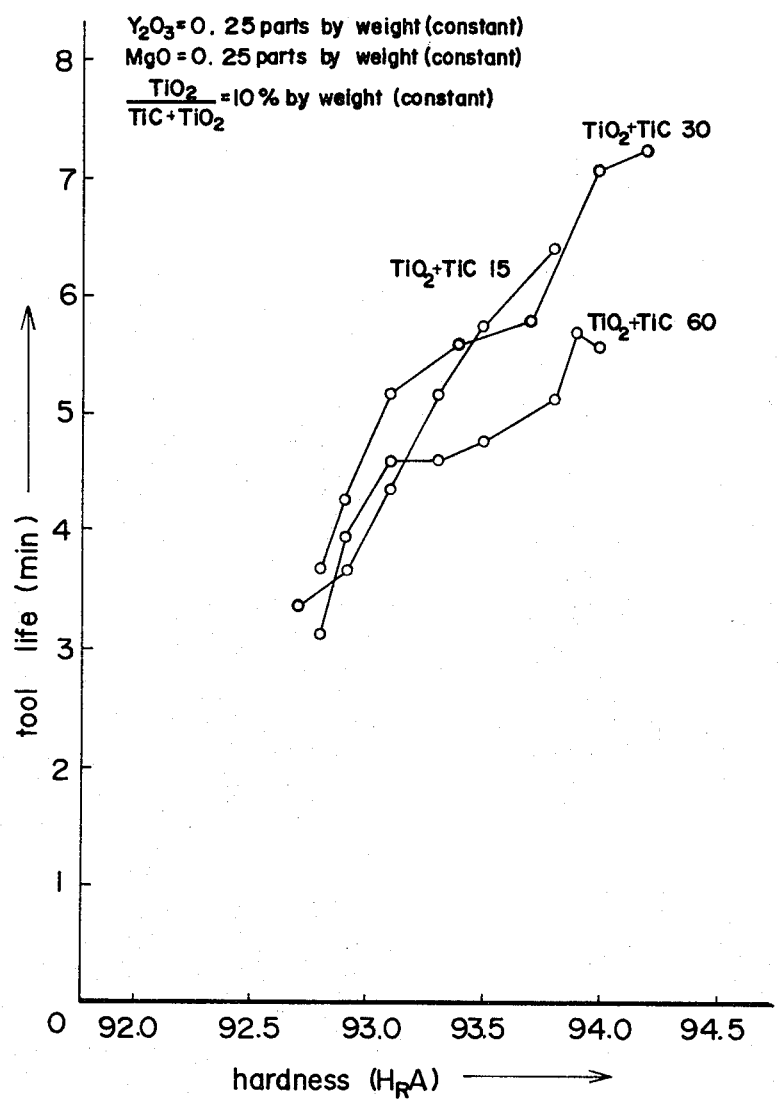

For evaluating the cutting performance if the various cutting tools, the cutting tools were subjected to continuous cutting test in which a lathe was used, work pieces of high-hardened steel SNCM-8 (Hs 85) and V$\times$d$\times$f=50 m/min$\times$0.5 mm$\times$0.2 mm/rev. In this cutting test, the tool life criterion was determined when the width of the flank wear reached 0.3 mm. FIG. 42 shows the life of the cutting tool with the condition that the $TiO_2/(TiC+TiO_2)$ ($\times 100\%$) was made constnt at 10% by weight and the $Y_2O_3$ amount was varied. FIG. 43 shows the life of the cutting tool with the condition that the $Y_2O_3$ amount was held constant at 0.25 parts by weight and the $TiO_2/(TiC+TiO_2)$ ($\times 100\%$) was varied. FIG. 44 shows the relationship between the hardness and the tool life.

Figure 45:
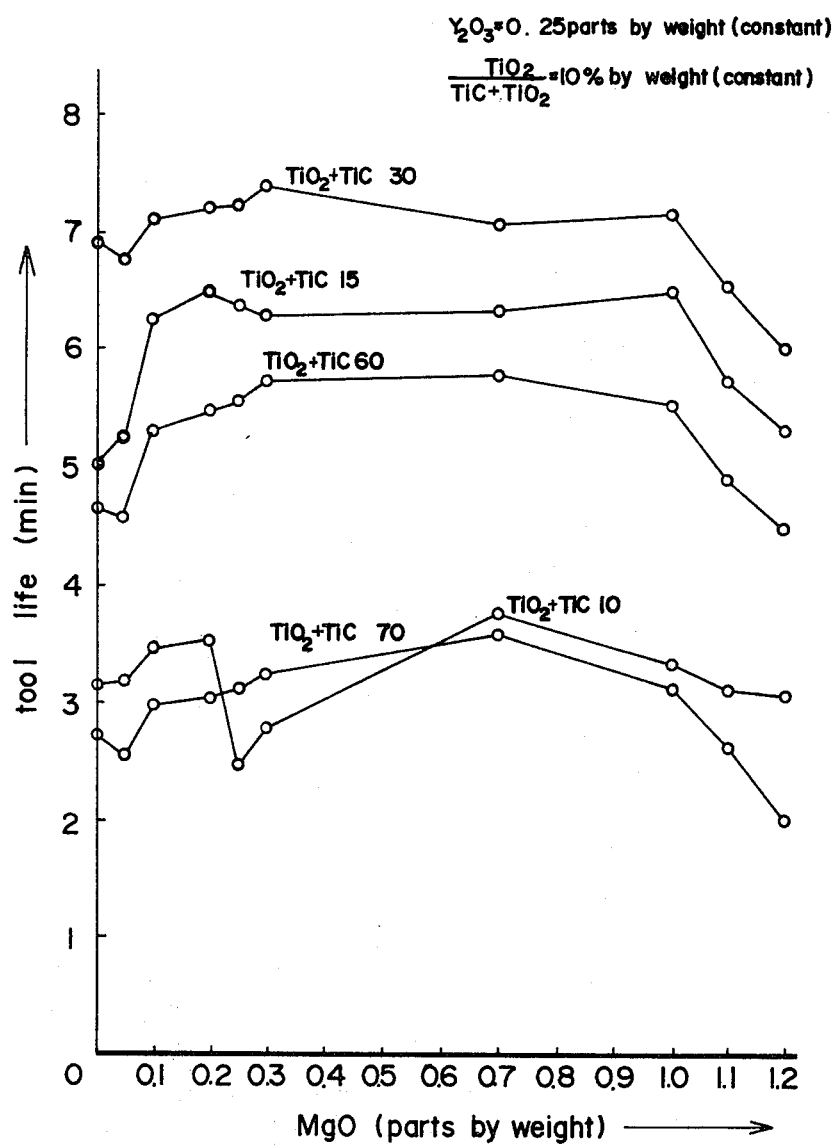
Figure 46:
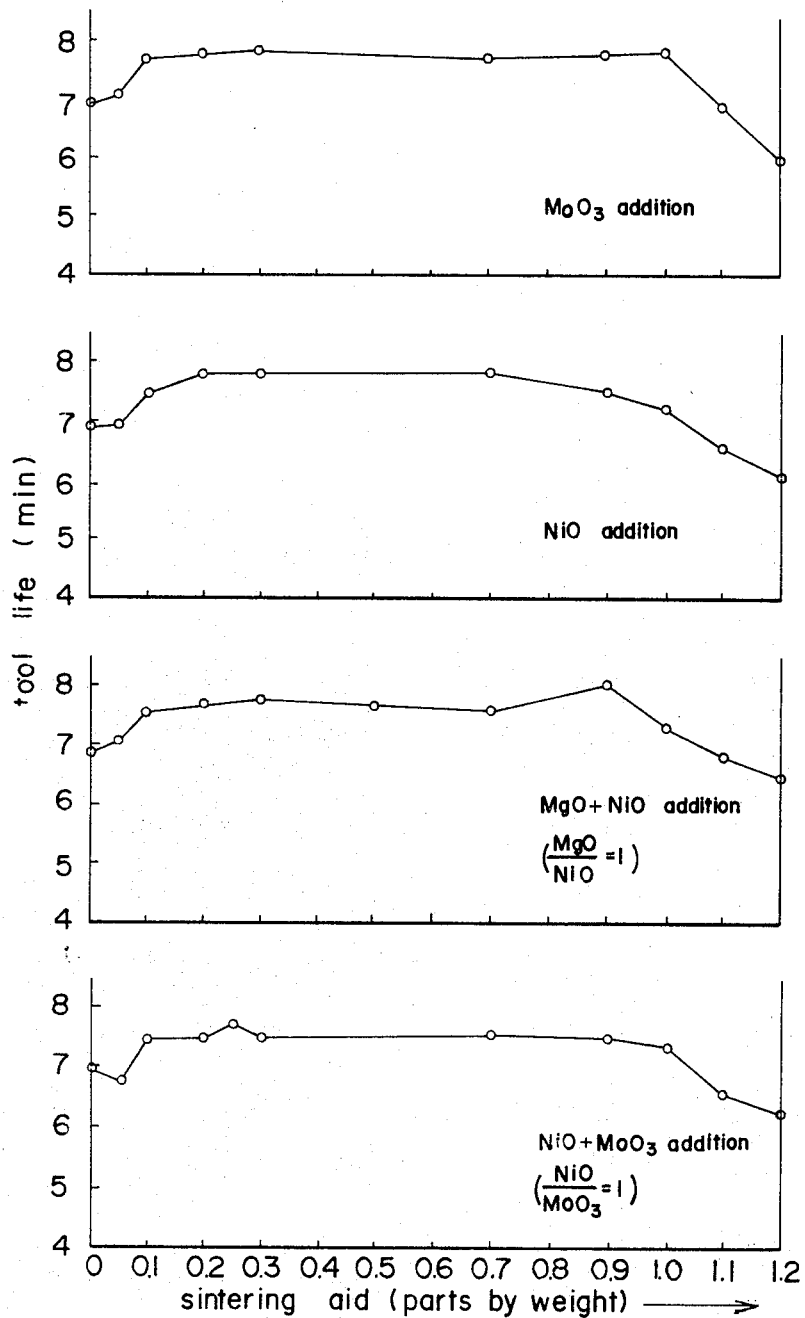

Additionally, the influence of MgO addition in the continuous cutting test under the same cutting conditions is shown in FIG. 45, while the influence of other sintering aids is shown in FIG. 46.

Furthermore, to check the chipping resistance of various cutting tools, the results of the milling in which the cast iron (FC 25) was cut under the following cutting conditions are shown in Table 12 to Table 14:

V$\times$d=245 m/min$\times$1.5 mm

Feed=0.4$\sim$1.0 mm/tooth

Namely, Table 12 shows the results of the chipping resistance test in which the $TiO_2/(TiC+TiO_2)$ ($\times 100\% = 10\%$) was held constant, MgO amount was held constant at 0.25 parts by weight and the $Y_2O_3$ amount was varied, Table 13 shows the results of the chipping resistance test in which $Y_2O_3$ amount was held constant at 0.25 parts by weight, MgO amount was held constant at 0.25 parts by weight and the $TiO_2/(TiC+TiO_2)$ ($\times 100\%$) was varied, while Table 14 shows the results of the chipping resistance test in which $Y_2O_3$ amount was held constant at 0.25 parts by by weight, the $TiO_2/(TiC+TiO_2)$ ($\times 100\% = 10\%$) was held constant and the MgO amount was varied.

In these Tables, marks "O" indicate no chipping occured in both (two) trials of the milling operation, marks "Δ" indicate the chipping occured in one trial of the milling operation and marks "x" indicate chipping occured in both trials of the milling operation.

TABLE 12

| $\dfrac{TiC + TiO_2}{Al_2O_3 + TiC + TiO_2} \times 100$ (% by weight) | $Y_2O_3$ (parts by weight) | feed f (mm/tooth) | | | | | | |
|---|---|---|---|---|---|---|---|---|
| | | 0.4 | 0.5 | 0.6 | 0.7 | 0.8 | 0.9 | 1.0 |
| 10 | 0.025 | O | O | × | | | | |
| | 0.050 | O | O | × | | | | |
| | 0.500 | O | O | O | × | | | |
| | 1.000 | O | O | Δ | × | | | |
| | 2.000 | O | O | × | | | | |
| | 2.500 | O | × | | | | | |
| 15 | 0.025 | O | O | O | Δ | × | | |
| | 0.050 | O | O | O | O | Δ | × | |
| | 0.500 | O | O | O | O | O | Δ | × |
| | 1.000 | O | O | O | O | O | O | × |
| | 2.000 | O | O | O | O | O | Δ | × |
| | 2.500 | O | O | O | O | × | | |
| 30 | 0.025 | O | O | Δ | × | | | |
| | 0.050 | O | O | O | O | O | Δ | × |
| | 0.500 | O | O | O | O | O | O | O |
| | 1.000 | O | O | O | O | O | O | O |
| | 2.000 | O | O | O | O | O | O | × |
| | 2.500 | O | O | O | × | | | |
| 60 | 0.025 | O | O | × | | | | |
| | 0.050 | O | O | O | O | O | × | |
| | 0.500 | O | O | O | O | O | Δ | × |
| | 1.000 | O | O | O | O | O | Δ | × |
| | 2.000 | O | O | O | O | O | × | |
| | 2.500 | O | O | × | | | | |
| 70 | 0.025 | O | × | | | | | |
| | 0.050 | O | O | Δ | × | | | |
| | 0.500 | O | O | O | × | | | |
| | 1.000 | O | O | O | × | | | |
| | 2.000 | O | Δ | × | | | | |
| | 2.500 | O | Δ | × | | | | |

TABLE 13

| $\dfrac{TiC + TiO_2}{Al_2O_3 + TiC + TiO_2} \times 100$ (% by weight) | $\dfrac{TiO_2}{TiC + TiO_2} \times 100$ (% by weight) | feed f (mm/tooth) | | | | | | |
|---|---|---|---|---|---|---|---|---|
| | | 0.4 | 0.5 | 0.6 | 0.7 | 0.8 | 0.9 | 1.0 |
| 10 | 4.0 | O | O | × | | | | |
| | 5.0 | O | O | O | × | | | |
| | 7.5 | O | O | Δ | × | | | |
| | 10.0 | O | O | O | × | | | |
| | 12.5 | O | O | O | × | | | |
| | 15.0 | O | O | O | × | | | |
| | 16.0 | O | O | × | | | | |
| 15 | 4.0 | O | O | O | O | Δ | × | |
| | 5.0 | O | O | O | O | O | O | × |
| | 7.5 | O | O | O | O | O | O | × |
| | 10.0 | O | O | O | O | O | O | O |
| | 12.5 | O | O | O | O | O | O | × |
| | 15.0 | O | O | O | O | O | Δ | × |
| | 16.0 | O | O | O | O | × | | |
| 30 | 4.0 | O | O | O | O | O | Δ | × |
| | 5.0 | O | O | O | O | O | O | × |
| | 7.5 | O | O | O | O | O | O | O |
| | 10.0 | O | O | O | O | O | O | O |
| | 12.5 | O | O | O | O | O | Δ | × |
| | 15.0 | O | O | O | O | Δ | × | |
| | 16.0 | O | O | O | × | | | |
| 60 | 4.0 | O | O | O | O | O | Δ | × |
| | 5.0 | O | O | O | O | O | Δ | × |
| | 7.5 | O | O | O | O | O | O | O |
| | 10.0 | O | O | O | O | O | O | × |
| | 12.5 | O | O | O | O | O | × | |
| | 15.0 | O | O | O | O | O | × | |
| | 16.0 | O | O | O | Δ | × | | |

TABLE 13-continued

| $\frac{TiC + TiO_2}{Al_2O_3 + TiC + TiO_2} \times 100$ (% by weight) | $\frac{TiO_2}{TiC + TiO_2} \times 100$ (% by weight) | feed f (mm/tooth) | | | | | | |
|---|---|---|---|---|---|---|---|---|
| | | 0.4 | 0.5 | 0.6 | 0.7 | 0.8 | 0.9 | 1.0 |
| 70 | 4.0 | O | O | × | | | | |
| | 5.0 | O | O | O | O | × | | |
| | 7.5 | O | O | O | O | Δ | × | |
| | 10.0 | O | O | O | O | × | | |
| | 12.5 | O | O | O | O | × | | |
| | 15.0 | O | O | Δ | × | | | |
| | 16.0 | O | O | × | | | | |

TABLE 14

| $\frac{TiC + TiO_2}{Al_2O_3 + TiC + TiO_2} \times 100$ (% by weight) | MgO (parts by weight) | feed f (mm/tooth) | | | | | | |
|---|---|---|---|---|---|---|---|---|
| | | 0.4 | 0.5 | 0.6 | 0.7 | 0.8 | 0.9 | 1.0 |
| 10 | 0.05 | O | O | Δ | Δ | × | | |
| | 0.10 | O | O | O | O | × | | |
| | 0.30 | O | O | O | O | Δ | × | |
| | 0.70 | O | O | O | O | × | | |
| | 1.00 | O | O | O | Δ | × | | |
| | 1.20 | O | O | O | Δ | | | |
| 15 | 0.05 | O | O | O | O | O | O | × |
| | 0.10 | O | O | O | O | O | O | O |
| | 0.30 | O | O | O | O | O | O | Δ |
| | 0.70 | O | O | O | O | O | × | |
| | 1.00 | O | O | O | O | O | O | × |
| | 1.20 | O | O | O | O | O | Δ | × |
| 30 | 0.05 | O | O | O | O | O | O | × |
| | 0.10 | O | O | O | O | O | O | Δ |
| | 0.30 | O | O | O | O | O | O | O |
| | 0.70 | O | O | O | O | O | Δ | × |
| | 1.00 | O | O | O | O | O | O | × |
| | 1.20 | O | O | O | O | Δ | × | |
| 60 | 0.05 | O | O | O | O | O | Δ | × |
| | 0.10 | O | O | O | O | O | O | O |
| | 0.30 | O | O | O | O | O | O | Δ |
| | 0.70 | O | O | O | O | O | O | × |
| | 1.00 | O | O | O | O | O | O | × |
| | 1.20 | O | O | O | O | O | × | |
| 70 | 0.05 | O | O | O | × | | | |
| | 0.10 | O | O | O | × | | | |
| | 0.30 | O | O | O | O | Δ | × | |
| | 0.70 | O | O | O | Δ | × | | |
| | 1.00 | O | O | O | × | | | |
| | 1.20 | O | O | Δ | × | | | |

(b) Evaluation

Although the influence in which the composition ratio or mixture ratio of the raw material composition affects the hot press sintering in this hot pressing method is approximately the same as that of the HIP method, the following phenomenon is particularly directed to the hot press sintering method. Namely, when the TiO₂/(TiC+TiO₂) (×100%) exceeds 15% by weight, the reaction between the sintered bodies and the crucible become remarkably active so that adhesions or adhesion cracks occur, resulting in the lowering of the yield rate of the sintered products.

The sintered bodies prepared by the hot pressing have shown almost the same hardness and the tool life as those of the sintered bodies prepared by HIP.

As has been described heretofore, the sintered bodies produced by the method of this embodiment have exhibited excellent performance properties, when used as a cutting tool material, such as high hardness and high density.

What we claim is:

1. A sintered body consisting essentially of:
   (1) 100 parts by weight of titanium carbide, titanium oxide and aluminumoxide, said titanium carbide and titamium oxide accounting for 15 to 60 percent by weight and said aluminum oxide accounting for 85 to 40 percent by weight, the amount of said titanium oxide relative to said titanium carbide and titanium oxide being 5 to 15 percent by weight, and
   (2) 0.039 to 1.575 parts by weight of yttrium, wherein said yttrium and titanium oxide exist in at least one of the following forms, (a) yttrium oxide, (b) a composition of yttrium oxide and titanium carbide, (c) a composition of yttrium oxide, titanium carbide and yttrium carbide, (d) a double carbide of titanium carbide and yttrium carbide, (e) a solid solution of aluminum oxide, yttrium oxide and titanium oxide, (f) a composition of solid solution consisting of aluminum oxide, yttrium oxide and titanium oxide and a double carbide of titanium carbide and yttrium carbide, (g) a composition of solid solution consisting of aluminum oxide, yttrium oxide and titanium oxide and titanium carbide, (h) a composition of solid solution consisting of aluminum oxide, yttrium oxide and titanium oxide and yttrium carbide, (i) a composition of solid solution consisting of aluminum oxide, yttrium oxide and titanium oxide and a solid solution consisting of titanium oxide, yttrium carbide and titanium carbide and (j) a composition of solid solution consisting of aluminum oxide, yttrium oxide and titanium oxide and a solid solution consisting of titanium carbide and titanium oxide.

2. A sintered body according to claim 1, wherein the hardness and the density of said sintered body are more than $H_RA$ 93.0 and more than 98.5% of the theoretical density respectively.

3. A sintered body according to claims 1 or 2, wherein said constituent grains have a mean grain size of less than 4 μm and a maximum grain size of less than 10 μm.

4. A sintered body consisting essentially of:
 (1) 100 parts by weight of titanium carbide, titanium oxide and aluminum oxide, said titanium carbide and titanium oxide accounting for 15 to 60 percent by weight and said aluminum oxide accounting for 85 to 40 percent by weight, the amount of said titanium oxide relative to said titanium carbide and titanium oxide being 5 to 15 percent by weight,
 (2) 0.039 to 1.575 parts by weight of yttrium, and
 (3) 0.1 to 1.0 part by weight of at least one sintering aid selected from a group consisting of nickel oxide, molybdenum oxide, chromium oxide, cobalt oxide, magnesium oxide, iron oxide and manganese oxide, wherein said yttrium, titanium oxide and sintering aid exist in at least one of the following forms, (a) yttrium oxide, (b) a composition of yttrium oxide and titanium carbide, (c) a composition of yttrium oxide, titanium carbide and yttrium carbide, (d) a double carbide of titanium carbide and yttrium carbide, (e) a solid solution of aluminum oxide, yttrium oxide, titanium oxide and at least one of said sintering aids, (f) a composition of solid solution consisting of aluminum oxide, yttrium oxide, titanium oxide and at least one of said sintering aids and a double carbide of titanium carbide and yttrium carbide, (g) a composition of solid solution consisting of aluminum oxide, yttrium oxide, titanium oxide and at least one of said sintering aids and titanium carbide, (h) a composition of solid solution consisting of aluminum oxide, yttrium oxide, titanium oxide and at least one of said sintering aids and yttrium carbide, (i) a composition of solid solution consisting of aluminum oxide, yttrium oxide, titanium oxide and at least one of said sintering aids and a solid solution consisting of titanium oxide, yttrium carbide and titanium carbide and (j) a composition of solid solution consisting of aluminum oxide, yttrium oxide titanium oxide and at least one of said sintering aids and a solid solution consisting of titanium carbide and titanium oxide.

5. A sintered body according to claim 4, wherein the hardness and the density of said sintered body are more than $H_RA$ 93.0 and more than 98.5% of the theoretical density respectively.

6. A sintered body according to claims 4 or 5, wherein said constituent grains have a mean grain size of less than 4 μm and a maximum grain size of less than 10 μm.

* * * * *